(12) United States Patent
Elsherbini et al.

(10) Patent No.: US 11,177,912 B2
(45) Date of Patent: Nov. 16, 2021

(54) QUANTUM CIRCUIT ASSEMBLIES WITH ON-CHIP DEMULTIPLEXERS

(71) Applicant: Intel Corporation, Santa Clara, CA (US)

(72) Inventors: Adel A. Elsherbini, Chandler, AZ (US); Javier A. Falcon, Chandler, AZ (US); Lester Lampert, Portland, OR (US)

(73) Assignee: Intel Corporation, Santa Clara, CA (US)

(*) Notice: Subject to any disclaimer, the term of this patent is extended or adjusted under 35 U.S.C. 154(b) by 733 days.

(21) Appl. No.: 15/913,026

(22) Filed: Mar. 6, 2018

(65) Prior Publication Data

US 2019/0044668 A1 Feb. 7, 2019

(51) Int. Cl.
*H04L 5/00* (2006.01)
*G06N 10/00* (2019.01)

(52) U.S. Cl.
CPC ............ *H04L 5/0001* (2013.01); *G06N 10/00* (2019.01)

(58) Field of Classification Search
CPC ......................................................... H04L 5/00
See application file for complete search history.

(56) References Cited

U.S. PATENT DOCUMENTS

| 9,735,776 | B1* | 8/2017 | Abdo | ................... | H03K 17/92 |
| 10,043,136 | B1* | 8/2018 | Abdo | ................... | F25B 9/12 |
| 2003/0111661 | A1 | 6/2003 | Tzalenchuk et al. | | |
| 2004/0251987 | A1* | 12/2004 | Nakamura | ............. | H01P 1/213 333/133 |
| 2016/0148112 | A1 | 5/2016 | Kwon | | |
| 2019/0006572 | A1 | 1/2019 | Falcon et al. | | |
| 2019/0043974 | A1 | 2/2019 | Thomas et al. | | |

(Continued)

FOREIGN PATENT DOCUMENTS

| JP | 2010511293 | 4/2010 |
| WO | 2015013532 | 1/2015 |

(Continued)

OTHER PUBLICATIONS

"Independent, extensible control of same-frequency superconducting qubits by selective broadcasting," Asaad et al., Netherlands Organisation for Applied Scientific Research, Aug. 28, 2015, 17 pages.

(Continued)

*Primary Examiner* — Sulaiman Nooristany
(74) *Attorney, Agent, or Firm* — Patent Capital Group

(57) ABSTRACT

One aspect of the present disclosure provides a quantum circuit assembly that includes a substrate with one or more qubit devices, and at least one demultiplexer included in a single chip with the qubit device(s). The demultiplexer is configured to receive a combined signal from external electronics, the combined signal including a combination of a plurality of signals in different frequency ranges, and to demultiplex said plurality of signals within the combined signal. The demultiplexer is further configured to apply different demultiplexed signals to different lines of a single qubit device, or/and to different qubit devices. Providing such demultiplexers on-chip with the qubit devices advantageously allows reducing the number of input/output lines coupling the chip with qubit devices and the external electronics.

23 Claims, 9 Drawing Sheets

500

PROVIDE A QUBIT CHIP WITH ONE OR MORE DEMULTIPLEXERS
502

PROVIDE EXTERNAL ELECTRONICS WITH ONE OR MORE POWER COMBINERS
504

CONNECT THE QUBIT CHIP WITH THE EXTERNAL ELECTRONICS
506

(56) References Cited

U.S. PATENT DOCUMENTS

| | | |
|---|---|---|
| 2019/0044044 A1 | 2/2019 | Lampert et al. |
| 2019/0044047 A1 | 2/2019 | Elsherbini et al. |
| 2019/0044048 A1 | 2/2019 | George et al. |
| 2019/0044049 A1 | 2/2019 | Thomas et al. |
| 2019/0055038 A1 | 3/2019 | Jeon et al. |
| 2019/0066840 A1 | 4/2019 | Schoenberg |
| 2019/0066843 A1 | 4/2019 | Carlson |
| 2019/0117930 A1 | 4/2019 | Al-Ali |
| 2019/0131511 A1 | 5/2019 | Clarke et al. |
| 2019/0140073 A1 | 5/2019 | Pillarisetty et al. |
| 2019/0148530 A1 | 5/2019 | Pillarisetty et al. |
| 2019/0157393 A1 | 5/2019 | Roberts et al. |
| 2019/0164077 A1 | 5/2019 | Roberts et al. |
| 2019/0164959 A1 | 5/2019 | Thomas et al. |
| 2019/0165152 A1 | 5/2019 | Roberts et al. |
| 2019/0117883 A1 | 6/2019 | Abrams et al. |
| 2019/0117929 A1 | 6/2019 | Reinberg |
| 2019/0117972 A1 | 6/2019 | Schmidt et al. |
| 2019/0117973 A1 | 6/2019 | Schmidt et al. |
| 2019/0117974 A1 | 6/2019 | Creasey et al. |
| 2019/0117975 A1 | 6/2019 | Grossman et al. |
| 2019/0117977 A1 | 6/2019 | Puleo et al. |
| 2019/0125348 A1 | 6/2019 | Shelton, IV et al. |
| 2019/0125423 A1 | 6/2019 | Hinton et al. |
| 2019/0125456 A1 | 6/2019 | Shelton, IV et al. |
| 2019/0125498 A1 | 6/2019 | Bernhard |
| 2019/0125499 A1 | 6/2019 | Uchitel et al. |
| 2019/0125500 A1 | 6/2019 | Oskam et al. |
| 2019/0125501 A1 | 6/2019 | Esbech et al. |
| 2019/0181256 A1 | 6/2019 | Roberts et al. |
| 2019/0194016 A1 | 6/2019 | Roberts et al. |
| 2019/0198618 A1 | 6/2019 | George et al. |
| 2019/0132963 A1 | 7/2019 | Yu et al. |
| 2019/0133027 A1 | 7/2019 | Herbster |
| 2019/0135769 A1 | 7/2019 | Thimmaiah et al. |
| 2019/0135770 A1 | 7/2019 | Plemper et al. |
| 2019/0135771 A1 | 7/2019 | Teverovskiy et al. |
| 2019/0206991 A1 | 7/2019 | Pillarisetty et al. |
| 2019/0206992 A1 | 7/2019 | George et al. |
| 2019/0206993 A1 | 7/2019 | Pillarisetty et al. |
| 2019/0214385 A1 | 7/2019 | Roberts et al. |
| 2019/0221659 A1 | 7/2019 | George et al. |
| 2019/0229188 A1 | 7/2019 | Clarke et al. |
| 2019/0229189 A1 | 7/2019 | Clarke et al. |
| 2019/0252377 A1 | 8/2019 | Clarke et al. |
| 2019/0259850 A1 | 8/2019 | Pillarisetty et al. |
| 2019/0266511 A1 | 8/2019 | Pillarisetty et al. |
| 2019/0267692 A1 | 8/2019 | Roberts et al. |
| 2019/0273197 A1 | 9/2019 | Roberts et al. |
| 2019/0288176 A1 | 9/2019 | Yoscovits et al. |
| 2019/0296214 A1 | 9/2019 | Yoscovits et al. |
| 2019/0305037 A1 | 10/2019 | Michalak et al. |
| 2019/0305038 A1 | 10/2019 | Michalak et al. |
| 2019/0312128 A1 | 10/2019 | Roberts et al. |
| 2019/0334020 A1 | 10/2019 | Amin et al. |
| 2019/0341459 A1 | 11/2019 | Pillarisetty et al. |
| 2019/0363181 A1 | 11/2019 | Pillarisetty et al. |
| 2019/0363239 A1 | 11/2019 | Yoscovits et al. |

FOREIGN PATENT DOCUMENTS

| | | |
|---|---|---|
| WO | 2017155531 A1 | 9/2017 |
| WO | 2017213638 A1 | 12/2017 |
| WO | 2017213639 A1 | 12/2017 |
| WO | 2017213641 A1 | 12/2017 |
| WO | 2017213645 A1 | 12/2017 |
| WO | 2017213646 A1 | 12/2017 |
| WO | 2017213647 A1 | 12/2017 |
| WO | 2017213648 A1 | 12/2017 |
| WO | 2017213649 A1 | 12/2017 |
| WO | 2017213651 A1 | 12/2017 |
| WO | 2017213661 A1 | 12/2017 |
| WO | 2017217958 A1 | 12/2017 |
| WO | 2018004634 | 1/2018 |
| WO | 2018030977 A1 | 2/2018 |
| WO | 2018044267 A1 | 3/2018 |
| WO | 2018057013 A1 | 3/2018 |
| WO | 2018057015 A1 | 3/2018 |
| WO | 2018057018 A1 | 3/2018 |
| WO | 2018057023 A1 | 3/2018 |
| WO | 2018057024 A1 | 3/2018 |
| WO | 2018057027 A1 | 3/2018 |
| WO | 2018063139 A1 | 4/2018 |
| WO | 2018063168 A1 | 4/2018 |
| WO | 2018063170 A1 | 4/2018 |
| WO | 2018063202 A1 | 4/2018 |
| WO | 2018063203 A1 | 4/2018 |
| WO | 2018063205 A1 | 4/2018 |
| WO | 2018106215 A1 | 6/2018 |
| WO | 2018118098 A1 | 6/2018 |
| WO | 2018143986 A1 | 8/2018 |
| WO | 2018160184 A1 | 9/2018 |
| WO | 2018160185 A1 | 9/2018 |
| WO | 2018160187 A1 | 9/2018 |
| WO | 2018164656 A1 | 9/2018 |
| WO | 2018182571 A1 | 10/2018 |
| WO | 2018182584 A1 | 10/2018 |
| WO | 2018200006 A1 | 11/2018 |
| WO | 2018231212 A1 | 12/2018 |
| WO | 2018231241 A1 | 12/2018 |
| WO | 2018236374 A1 | 12/2018 |
| WO | 2018236403 A1 | 12/2018 |
| WO | 2018236404 A1 | 12/2018 |
| WO | 2018236405 A1 | 12/2018 |
| WO | 2019004990 A1 | 1/2019 |
| WO | 2019004991 A1 | 1/2019 |
| WO | 2019032114 A1 | 2/2019 |
| WO | 2019032115 A1 | 2/2019 |

OTHER PUBLICATIONS

"Multilayer microwave integrated quantum circuits for scalable quantum computing," Brecht et al., Department of Applied Physics, Yale University, Sep. 4, 2015, 5 pages.

"Reducing intrinsic loss in superconducting resonators by surface treatment and deep etching of silicon substrates," Bruno, et al., QuTech Advanced Research Center and Kavli Institute of Nanoscience, Delft University of Technology, The Netherlands, Feb. 16, 2015, 9 pages.

"Surface loss simulations of superconducting coplanar waveguide resonators," Wenner et al. Applied Physics Letters 99, 113513 (2011), pp. 113513-1 through 113513-3.

"Magnetic field tuning of coplanar waveguide resonators," Healey, et al., Applied Physics Letters 93, 043513 (2008), pp. 043513-1 through 043513-3 (4 pages with cover sheet).

"Embracing the quantum limit in silicon computing," Morton et al., Macmillan Publishers, Nov. 17, 2011, vol. 479, Nature, pp. 345-353.

"Scalable quantum circuit and control for a superconducting surface code," Versluis et al., Netherlands Organisation for Applied Scientific Research, Dec. 28, 2016, 9 pages.

"Suspending superconducting qubits by silicon micromachining," Chu et al., Department of Applied Physics, Yale University, Jun. 10, 2016, 10 pages.

International Search Report and Written Opinion in International Patent Application No. PCT/US2016/040601 dated Mar. 31, 2017, 8 pages.

"Concentric Transmon qubit featuring fast turnability and an anisotropic magnetic dipole moment," Braumuller et al., Applied Physics Letters, 108:3, Jan. 2016.

PCT/US2016/04060, Jul. 1, 2016, Flux Bias Lines Below Qubit Plane.

PCT/US2017/024396, Mar. 28, 2017, Controlled Current Flux Lines for Qubits.

PCT/US2017/024653, Mar. 29, 2017, Slow Wave Microwave Lines for Qubits.

U.S. Appl. No. 15/897,712, filed Feb. 15, 2018, Reduce Flux Cross Talk from Flux Bias Line Operation.

* cited by examiner

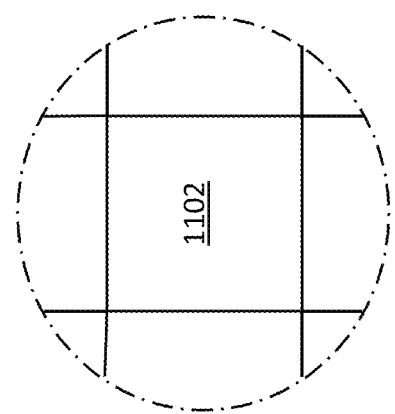
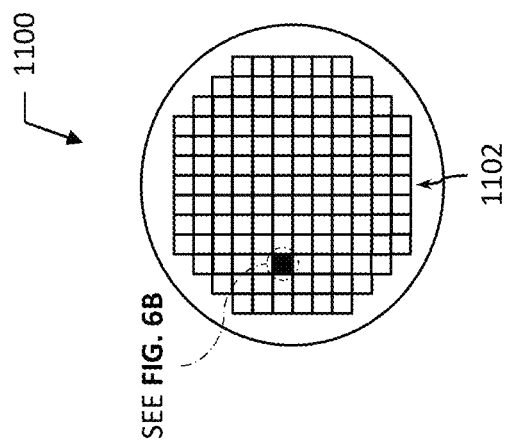
FIG. 6B
FIG. 6A

QUANTUM CIRCUIT ASSEMBLIES WITH ON-CHIP DEMULTIPLEXERS

TECHNICAL FIELD

This disclosure relates generally to the field of quantum computing, and more specifically, to quantum circuits, assemblies, and systems, and to methods of fabrication thereof.

BACKGROUND

Quantum computing refers to the field of research related to computation systems that use quantum-mechanical phenomena to manipulate data. These quantum-mechanical phenomena, such as superposition (in which a quantum variable can simultaneously exist in multiple different states) and entanglement (in which multiple quantum variables have related states irrespective of the distance between them in space or time), do not have analogs in the world of classical computing.

Quantum computers use so-called quantum bits, referred to as qubits (both terms "bits" and "qubits" often interchangeably refer to the values that they hold as well as to the actual devices that store the values). Similar to a bit of a classical computer, at any given time, a qubit can be either 0 or 1. However, in contrast to a bit of a classical computer, a qubit can also be 0 and 1 at the same time, which is a result of superposition of quantum states—a uniquely quantum-mechanical phenomenon. Entanglement also contributes to the unique nature of qubits in that input data to a quantum processor can be spread out among entangled qubits, allowing manipulation of that data to be spread out as well: providing input data to one qubit results in that data being shared to other qubits with which the first qubit is entangled.

Compared to well-established and thoroughly researched classical computers, quantum computing is still in its infancy, with the highest number of qubits in a solid-state quantum processor currently being below 100. One of the main challenges resides in protecting qubits from decoherence so that they can stay in their information-holding states long enough to perform the necessary calculations and read out the results. For this reason, qubits are often operated at cryogenic temperatures, typically just a few degrees Kelvin or even just a few milliKelvin above absolute zero, because at cryogenic temperatures thermal energy is low enough to not cause spurious excitations, which is thought to help minimize qubit decoherence. While dies on which one or more qubit devices are implemented (referred to in the following as "qubit dies") and chips containing one or more of such dies (referred to in the following as "qubit chips") are operated at cryogenic temperatures by being placed in a cooling apparatus such as a dilution refrigerator, various electronic circuits for controlling functionality of the qubit devices are often external to the cryogenic environment of the qubit chip, typically operated at room temperatures outside of the dilution refrigerator and, therefore, are typically referred to as "external electronics." Providing input/output (IO) lines coupling the qubit chip and the external electronics is not a trivial task, especially as numbers of qubits on a given chip continue to scale upward, and further improvements are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 6A and 6B are top views of a wafer and dies that may include one or more of quantum circuit assemblies with superconducting qubits and on-chip demultiplexers, according to some embodiments of the present disclosure.

DETAILED DESCRIPTION

Overview

Figure 1:
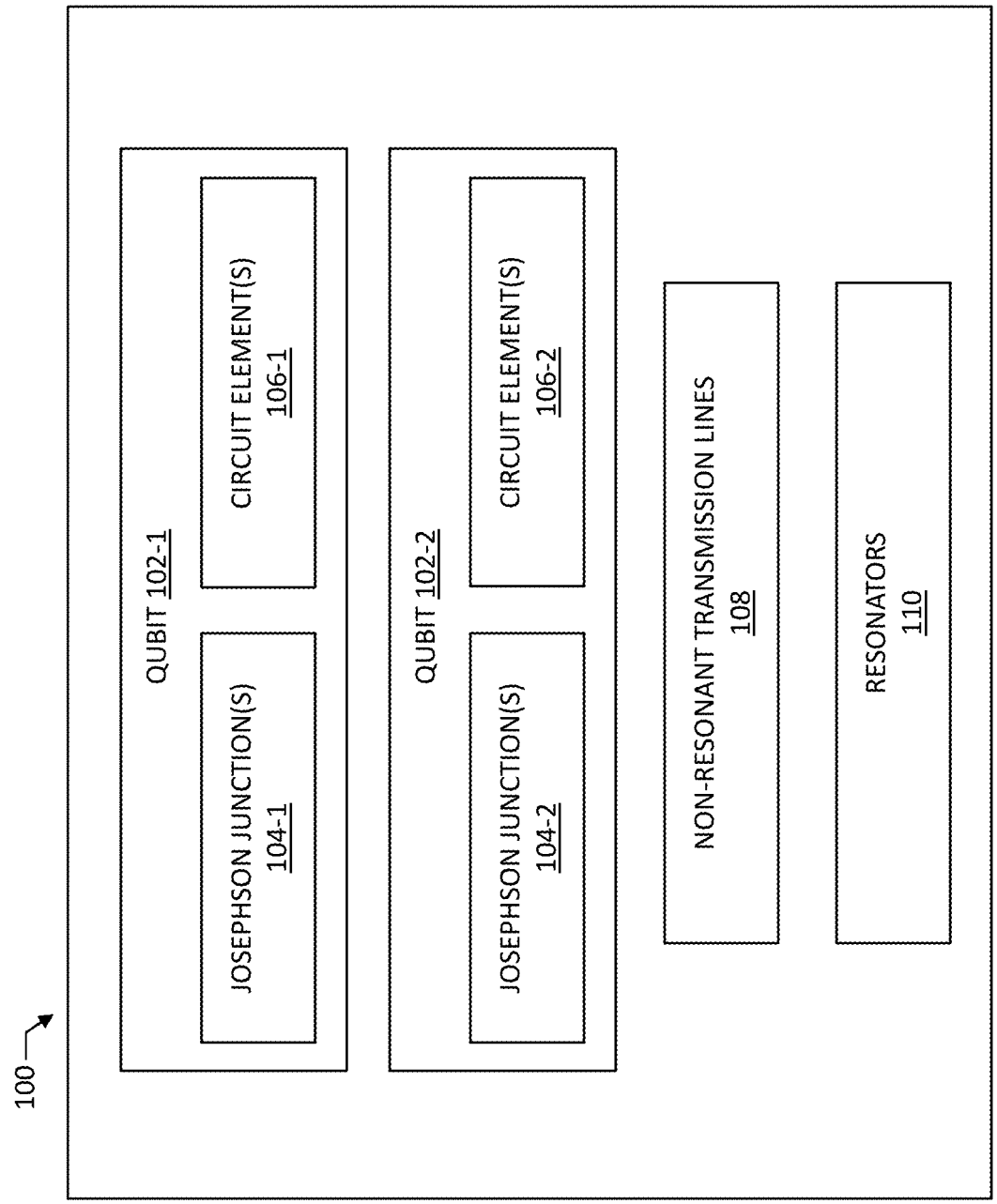
FIG. 1 provides a schematic illustration of an exemplary quantum circuit implementing superconducting qubits, according to some embodiments of the present disclosure.

As briefly described above, quantum computing, or quantum information processing, refers to the field of research related to computation systems that use quantum-mechanical phenomena to manipulate data. One example of quantum-mechanical phenomena is the principle of quantum superposition, which asserts that any two or more quantum states can be added together, i.e. superposed, to produce another valid quantum state, and that any quantum state can be represented as a sum of two or more other distinct states. Quantum entanglement is another example of quantum-mechanical phenomena. Entanglement refers to groups of particles being generated or interacting in such a way that the state of one particle becomes intertwined with that of the others. Furthermore, the quantum state of each particle cannot be described independently. Instead, the quantum state is given for the group of entangled particles as a whole. Yet another example of quantum-mechanical phenomena is sometimes described as a "collapse" because it asserts that when we observe (measure) particles, we unavoidably change their properties in that, once observed, the particles cease to be in a state of superposition or entanglement (i.e. by trying to ascertain anything about the particles, we collapse their state).

Put simply, superposition postulates that a given particle can be simultaneously in two states, entanglement postulates that two particles can be related in that they are able to instantly coordinate their states irrespective of the distance between them in space and time, and collapse postulates that when one observes a particle, one unavoidably changes the state of the particle and its' entanglement with other particles. These unique phenomena make manipulation of data in quantum computers significantly different from that of classical computers (i.e. computers that use phenomena of classical physics). Therefore, both the industry and the academics continue to focus on a search for new and improved physical systems whose functionality could approach that expected of theoretically designed qubits.

Physical systems for implementing qubits that have been explored until now include e.g. superconducting qubits, silicon (Si) quantum dot qubits, single trapped ion qubits, photon polarization qubits, etc. Out of the various physical implementations of qubits, superconducting qubits are promising candidates for building a quantum computer, where, in general, superconducting qubits refer to qubit devices that operate based on Josephson effect which is a macroscopic quantum phenomenon of supercurrent, i.e. a current that, due to zero electrical resistance, flows indefinitely long without any voltage applied, across a non-linear inductive device known as a Josephson Junction. One challenge with qubits in general, and superconducting qubits in particular, remains in protecting qubits from decoherence (i.e. loss of state, and, therefore loss of information that a qubit is supposed to hold). For this reason, materials, fabrication methods, and layout designs used for building quantum circuits continuously focus on reducing spurious (i.e. unintentional and undesirable) two-level systems (TLS's), thought to be the dominant source of qubit decoherence, where, in general, as used in quantum mechanics, a two-level (also referred to as "two-state") system is a system that can exist in any quantum superposition of two independent and physically distinguishable quantum states.

Embodiments of the present disclosure provide improved quantum circuit assemblies implementing at least one, but typically a plurality, of qubit devices, e.g. one or more superconducting qubit devices. In one aspect, a quantum circuit assembly includes a substrate, one or more qubit devices provided over, on, or at least partially in the substrate, and at least one demultiplexer included in a single chip (i.e., on-chip) with the substrate with the qubit devices. In various embodiments, the at least one demultiplexer may be provided either on the same substrate as the qubit device or on a different substrate coupled to the substrate of the qubit device. The at least one demultiplexer is configured to receive at least one combined signal from external electronics, the combined signal including a combination of a plurality of signals in different frequency ranges, and to demultiplex (i.e. separate) said plurality of signals within the combined signal. The demultiplexer is further configured to apply different demultiplexed signals to different lines of a single qubit device, or/and to apply different demultiplexed signals to different qubit devices. Providing such demultiplexers on-chip with the qubit devices advantageously allows reducing the number of IO lines coupling the chip with qubit devices and the external electronics.

As used herein, the term "chip" is used to describe an integrated circuit (IC) package that includes a package substrate and one or more substrates/dies arranged on and coupled to the package substrate, where the package substrate is to provide power and signals to the one or more dies and where the one or more dies include at least a qubit die (i.e. a substrate with one or more qubits) and a die with one or more demultiplexers as described herein, the die with the one or more demultiplexers being either the same or a different die than the qubit die.

In order to provide substantially lossless connectivity to, from, and between the qubits, some or all of the electrically conductive portions of various quantum circuit elements described herein (e.g. islands of the qubits, coupling components, readout resonators, microwave feed lines, drive lines, various ground planes, electrodes of Josephson Junctions and leads to such electrodes) may be made from one or more superconductive materials. However, some or all of these electrically conductive portions could be made from electrically conductive materials which are not superconductive. In the following, unless specified otherwise, reference to an electrically conductive material or circuit element implies that a superconductive material can be used, and vice versa (i.e. reference to a superconductor implies that a conductive material which is not superconductive may be used). Furthermore, any material described herein as a "superconductive/superconducting material" may refer to one or more materials, including alloys of materials, which exhibit superconducting behavior at typical qubit operating conditions (e.g. materials which exhibit superconducting behavior at very low temperatures at which qubits typically operate), but which may or may not exhibit such behavior at higher temperatures (e.g. at room temperatures). Examples of such materials include aluminum (Al), niobium (Nb), niobium nitride (NbN), titanium nitride (TiN), niobium titanium nitride (NbTiN), indium (In), and molybdenum rhenium (MoRe), all of which are particular types of superconductors at qubit operating temperatures, as well as their alloys.

While some descriptions are provided with reference to superconducting qubits, in particular to transmons, a particular class of superconducting qubits, at least some teachings of the present disclosure may be applicable to implementations of any qubits, including superconducting qubits other than transmons and/or including qubits other than superconducting qubits, which may employ flux bias lines and microwave drive lines as described herein, all of which are within the scope of the present disclosure. For example, the quantum circuit device assemblies described herein may be used in quantum circuits employing nanowire transmons. In another example, the quantum circuit device assemblies described herein may be used in hybrid semiconducting-superconducting quantum circuits. Furthermore, while some descriptions are provided with reference to diplexers, a subset of demultiplexers configured to separate received input signals into two signals in different frequency ranges, these descriptions may easily be extended to demultiplexers configured to separate received input signals into more than two signals in different frequency ranges, all of which are within the scope of the present disclosure. Still further, demultiplexers described herein may also function as multiplexers, combining multiple received signals into one.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

In the drawings, some schematic illustrations of exemplary structures of various devices and assemblies described herein may be shown with precise right angles and straight lines, but it is to be understood that such schematic illustrations may not reflect real-life process limitations which may cause the features to not look so "ideal" when any of the structures described herein are examined using e.g. scanning electron microscopy (SEM) images or transmission electron microscope (TEM) images. In such images of real structures, possible processing defects could also be visible, such as e.g. not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication. Furthermore, the accompanying drawings are not necessarily drawn to scale.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers.

While the disclosure may use the singular term "layer," the term "layer" should be understood to refer to assemblies that may include multiple different material layers.

In the following detailed description, various aspects of the illustrative implementations will be described using terms commonly employed by those skilled in the art to convey the substance of their work to others skilled in the art. For example, the terms "oxide," "carbide," "nitride," etc. refer to compounds containing, respectively, oxygen, carbon, nitrogen, etc. The terms "substantially," "close," "approximately," "near," and "about," generally refer to being within +/−20% of a target value based on the context of a particular value as described herein or as known in the art. Similarly, terms indicating orientation of various elements, such as e.g. "coplanar," "perpendicular," "orthogonal," "parallel," or any other angle between the elements, generally refer to being within +/−5-10% of a target value based on the context of a particular value as described herein or as known in the art. Furthermore, as used herein, terms indicating what may be considered an idealized behavior, such as e.g. "superconducting" or "lossless", are intended to cover functionality that may not be exactly ideal but is within acceptable margins for a given application. For example, a certain level of loss, either in terms of non-zero electrical resistance or non-zero amount of spurious TLS's may be acceptable such that the resulting materials and structures may still be referred to by these "idealized" terms. Specific values associated with an acceptable level of loss are expected to change over time as fabrication precision will improve and as fault-tolerant schemes may become more tolerant of higher losses, all of which are within the scope of the present disclosure.

Still further, while the present disclosure may include references to radiofrequency (RF), in particular microwave, signals, this is done only because current qubits are designed to work with such signals because the energy in the microwave range is higher than thermal excitations at the temperature at which the qubits are typically operated. In addition, techniques for the control and measurement of microwaves are well known. For these reasons, typical frequencies of qubits are in 1-10 GHz, e.g. in 3-8 GHz, range, in order to be higher than thermal excitations, but low enough for ease of microwave engineering. However, advantageously, because excitation energy of qubits is controlled by the circuit elements, qubits can be designed to have any frequency. Therefore, in general, qubits could be designed to operate with signals in other ranges of electromagnetic spectrum and embodiments of the present disclosure could be modified accordingly. All of these alternative implementations are within the scope of the present disclosure.

Quantum Computing and Superconducting Qubits

In order to highlight the advantages offered by novel superconducting quantum circuits with on-chip demultiplexers described herein, it would be helpful to first describe various implementations of quantum circuits with superconducting qubits that could be included in a qubit chip. FIG. 1 provides a schematic illustration of an exemplary quantum circuit 100 implementing superconducting qubits, i.e. a superconducting quantum circuit.

As shown in FIG. 1, an exemplary quantum circuit 100 may include two or more qubits 102, e.g. superconducting qubits, (reference numerals following after a dash, such as e.g. qubit 102-1 and 102-2 indicate different instances of the same or analogous element). Each of the qubits 102 may include one or more non-linear inductive elements (e.g., Josephson Junctions) 104. Josephson Junctions are integral building blocks in superconducting quantum circuits where they form the basis of quantum circuit elements that can approximate functionality of theoretically designed qubits.

In general, a Josephson Junction includes two superconductors coupled by a so-called weak link that weakens the superconductivity between the two superconductors. In quantum circuits, a weak link of a Josephson Junction may e.g. be implemented by providing a thin layer of an insulating, non-superconductive metal, or a semiconducting material, typically referred to as a "barrier" or a "tunnel barrier," sandwiched, in a stack-like arrangement, between two layers of superconductor, which two superconductors serve as a first and a second electrode of a Josephson Junction. The Josephson Junction provides a non-linear inductive element to the circuit and allows the qubit to become an anharmonic oscillator. The anharmonicity is determined by the ratio of the charging energy, which stems from the total capacitance between a first and second element of the qubit, and the Josephson energy of the non-linear inductive element (e.g., Josephson Junction). The anharmonicity is what allows the state of the qubit to be controlled to a high level of fidelity. In addition to controlling the anharmonicity, the charging and Josephson energies also control the qubit frequency.

Typically, when a qubit employs only one Josephson Junction, a frequency of the qubit cannot be changed substantially beyond what is defined by the design unless one of the qubit capacitive elements is tunable. Employing two or more Josephson Junctions, e.g. arranged in a so-called superconducting quantum interference device (SQUID), allows controlling the frequency of the qubit, which, in turn, allows greater control as to whether and when the qubit interacts with other components of a quantum circuit, e.g. with other qubits. In general, a SQUID of a superconducting qubit includes a pair of Josephson Junctions and a loop of a conductive, typically superconductive material (i.e. a superconducting loop), connecting a pair of Josephson Junctions. Applying a net magnetic field in a certain orientation to the SQUID loop of a superconducting qubit allows controlling the frequency of the qubit. In particular, applying magnetic field to the SQUID region of a superconducting qubit is generally referred to as a "flux control" of a qubit, and the magnetic field is generated by providing direct-current (DC) and/or a relatively low-frequency, typically below 1 GHz, current through an electrically conductive or superconductive line generally referred to as a "flux bias line" (also known as a "flux line" or a "flux coil line"). By providing flux bias lines sufficiently close to SQUIDs, magnetic fields generated as a result of currents running through the flux bias lines extend to the SQUIDs, thus tuning qubit frequencies.

Turning back to FIG. 1, within each qubit 102, the one or more Josephson Junctions 104 may be directly electrically connected to one or more other circuit elements 106, which, in combination with the Josephson Junction(s) 104, form a non-linear oscillator circuit providing multi-level quantum system where the first two to three levels define the qubit under normal operation. The circuit elements 106 could be e.g. shunt capacitors, superconducting loops of a SQUID, electrodes for setting an overall capacitance of a qubit, or/and ports for capacitively coupling the qubit to one or more of a readout resonator, a coupling or "bus" component, and a direct microwave drive line, or electromagnetically coupling the qubit to a flux bias line.

As also shown in FIG. 1, an exemplary quantum circuit 100 typically includes a plurality of non-resonant transmission lines 108, and a plurality of resonators 110. The non-resonant transmission lines 108 are typically used for providing microwave signals to different quantum circuit elements and components, which elements and components include e.g. readout resonators for various qubits, and may be considered to implement external readout and/or control of qubits. For example, for superconducting qubits, examples of the non-resonant transmission lines 108 include flux bias lines, read lines and microwave drive lines. On the other hand, the resonators 110 may be viewed as implementing internal control lines for qubits. For superconducting qubits, examples of the resonators 100 include coupling and readout resonators.

In general, a resonator 110 of a quantum circuit differs from a non-resonant microwave transmission line 108 in that a resonator is deliberately designed to support resonant oscillations (i.e. resonance), under certain conditions. In contrast, non-resonant transmission lines may be similar to conventional microwave transmission lines in that they are designed to avoid resonances, especially resonances at frequencies/wavelengths close to the resonant frequencies/wavelengths of any resonant object used in the quantum computing circuits, e.g., qubits, bus resonators, or readout resonators in the proximity of such non-resonant lines. Once non-resonant transmission lines are manufactured, some of them may inadvertently support some resonances, but, during its design, efforts are taken to minimize resonances, standing waves, and reflected signals as much as possible, so that all of the signals can be transmitted through these lines without, or with as little resonance as possible.

On-chip capacitive coupling between quantum or control elements can be achieved either through use of coupling components such as a coupling component on a neighboring qubit, a lumped element capacitor, a lumped element resonator, or a transmission line segment. A resonator is a transmission line segment that is made by employing fixed boundary conditions, and these boundary conditions control the frequencies/wavelengths which will resonate within a given transmission line segment used to implement a resonator. In order to satisfy boundary conditions for resonance, each end of a transmission line segment resonator can be either a node, if it is shorted to ground (e.g. where one end of the transmission line segment structure is electrically connected to a ground plane), or an antinode, if it is capacitively or inductively coupled to ground or to another quantum circuit element. Thus, resonators 110 differ from non-resonant microwave transmission lines 108 in how these lines are terminated at the relevant ends. A line used to route a signal on a substrate, i.e. one of the non-resonant transmission lines 108, typically extends from a specific source, e.g. a bonding pad or another type of electrical connection to a source, to a specific load (e.g. a short circuit proximate to SQUID loop, a quantum dot device, another bonding pad, or another electrical connection to a load). In other words, non-resonant transmission lines 108 terminate with electrical connections to sources, ground sinks, and/or loads. On the other hand, a transmission line resonator is typically composed of a piece of transmission line terminated with either two open circuits (in case of a half-wavelength resonator) or an open and a short circuit (in case of a quarter-wavelength resonator). In this case, for a desired resonant frequency, transmission line length may e.g. be a multiple of a microwave wavelength divided by 2 or 4, respectively. However, other terminations are possible, for example capacitive or inductive, and in this case the required line length to support resonance will be different from that identified above. For example, capacitive terminations may be used for resonators which are coupled to qubits, to a feedline, line, or to another resonator by a capacitive interaction.

Besides line termination by capacitive or inductive coupling or a short circuit, in order to support resonant oscillations, transmission line segments of the resonators 110 need to be of a specific length that can support such oscillations. That is why, often times, resonators 110 may be laid out on a substrate longer than the actual distance would require (i.e. a non-resonant transmission line would typically be laid out to cover the distance in the most compact manner possible, e.g. without any curves, wiggles, or excess length, while a resonator may need to have curves, wiggles, and be longer than the shortest distance between the two elements the resonator is supposed to couple in order to be sufficiently long to support resonance).

One type of the resonators 110 used with superconducting qubits are so-called coupling resonators (also known as "bus resonators"), which provide one manner for coupling different qubits together in order to realize quantum logic gates. These types of resonators are analogous in concept and have analogous underlying physics as readout resonators, except that a coupling or "bus" resonator involves only capacitive couplings between two or more qubits whereas a readout resonator involves capacitive coupling between two or more qubits and a feedline. A coupling resonator may be implemented as a microwave transmission line segment that includes capacitive or inductive connections to ground on both sides (e.g. a half-wavelength resonator), which results in oscillations (resonance) within the transmission line. While the ends of a coupling resonator have open circuits to the ground, each side of a coupling resonator is coupled, either capacitively or inductively, to a respective (i.e. different) qubit by being in the appropriate location and sufficient proximity to the qubit. Because different regions of a coupling resonator have coupling with a respective different qubit, the two qubits are coupled together through the coupling resonator. Thus, coupling resonators may be employed for implementing logic gates.

Another type of the resonators 110 used with superconducting qubits are so-called readout resonators, which may be used to read the state(s) of qubits. In some embodiments, a corresponding readout resonator may be provided for each qubit. A readout resonator, similar to the bus coupling resonator, is a transmission line segment. On one end it may have an open circuit connection to ground as well as any capacitively or inductively coupled connections to other quantum elements or a non-resonant microwave feedline. On the other end, a readout resonator may either have a capacitive connection to ground (for a half-wavelength resonator) or may have a short circuit to the ground (for a quarter-wavelength resonator), which also results in oscillations within the transmission line, with the resonant frequency of the oscillations being close to the frequency of the qubit. A readout resonator is coupled to a qubit by being in the appropriate location and sufficient proximity to the qubit, again, either through capacitive or inductive coupling. Due to a coupling between a readout resonator and a qubit, changes in the state of the qubit result in changes of the resonant frequency of the readout resonator. In turn, changes in the resonant frequency of the readout resonator can be read externally via connections which lead to external electronics e.g. wire or solder bonding pads.

For the non-resonant transmission lines 108, some descriptions of flux bias lines were provided above and, in the interests of brevity are not repeated here. In general, running a current through a flux bias line, provided e.g. from a wirebonding pads, solder bump, mechanical connector, or any other connection element, allows tuning (i.e. changing) the frequency of a corresponding qubit 102 to which a given flux bias line is connected. As a result of running the current in a given flux bias line, magnetic field is created around the line. If such a magnetic field is in sufficient proximity to a given qubit 102, e.g. by a portion of the flux bias line being provided next (sufficiently close) to the qubit 102, the magnetic field couples to the qubit, thereby changing the spacing between the energy levels of the qubit. This, in turn, changes the frequency of the qubit since the frequency is directly related to the spacing between the energy levels via the equation $E=h\nu$ (Planck's equation), where E is the energy (in this case the energy difference between energy levels of a qubit), h is the Planck's constant and $\nu$ is the frequency (in this case the frequency of the qubit). As this equation illustrates, if E changes, then $\nu$ changes. Different currents and pulses of currents can be sent down each of the flux lines allowing for independent tuning of the various qubits.

Typically, the qubit frequency may be controlled in order to bring the frequency either closer to or further away from another resonant item, for example a coupling resonator or a coupled neighbor qubit, to implement multi-qubit interactions, as may be desired in a particular setting.

For example, if it is desirable that a first qubit 102-1 and a second qubit 102-2 interact, via a coupling resonator (i.e. an example of the resonators 110) connecting these qubits, then both qubits 102 may need to be tuned to be at nearly the same frequency or a detuning equal, or nearly equal, to the anharmonicity. One way in which such two qubits could interact is that, if the frequency of the first qubit 102-1 is tuned very close to the resonant frequency of the coupling resonator, the first qubit can, when in the excited state, relax back down to the ground state by emitting a photon (similar to how an excited atom would relax) that would resonate within the coupling resonator. If the second qubit 102-2 is also at this energy (i.e. if the frequency of the second qubit is also tuned very close to the resonant frequency of the coupling resonator), then it can absorb the photon emitted from the first qubit, via the coupling resonator coupling these two qubits, and be excited from its ground state to an excited state. Thus, the two qubits interact, or are entangled, in that a state of one qubit is controlled by the state of another qubit. In other scenarios, two qubits could interact via exchange of virtual photons, where the qubits do not have to be tuned to be at the same frequency with one another. In general, two or more qubits could be configured to interact with one another by tuning their frequencies to specific values or ranges.

On the other hand, it may sometimes be desirable that two qubits coupled by a coupling resonator do not interact, i.e. the qubits are independent. In this case, by applying magnetic flux, by means of controlling the current in the appropriate flux bias line, to one qubit it is possible to cause the frequency of the qubit to change enough so that the photon it could emit no longer has the right frequency to resonate on the coupling resonator or on the neighboring qubit via a virtual photon transfer through the bus. If there is nowhere for such a frequency-detuned photon to go, the qubit will be better isolated from its surroundings and will live longer in its current state. Thus, in general, two or more qubits could be configured to reduce interactions with one another by tuning their frequencies to specific values or ranges.

The state(s) of each qubit 102 may be read by way of its corresponding readout resonator of the resonators 110. As explained below, the state of qubit 102 induces a shift in the resonant frequency in the associated readout resonator. This shift in resonant frequency can then be read out using its coupling to a feedline. To that end, an individual readout resonator may be provided for each qubit. As described above, a readout resonator may be a transmission line segment that includes a capacitive connection to ground on one side and is either shorted to the ground on the other side (for a quarter-wavelength resonator) or has a capacitive connection to ground (for a half-wavelength resonator), which results in oscillations within the transmission line (resonance) that depends upon the state of a proximal qubit. A readout resonator may be coupled to its corresponding qubit 102 by being in an appropriate location and sufficient proximity to the qubit, more specifically in an appropriate location and sufficient proximity to a first element (or "island") of the qubit 102 that capacitively couples to the readout resonator, when the qubit is implemented as a transmon. Due to a coupling between the readout resonator and the qubit, changes in the state of the qubit result in changes of the resonant frequency of the readout resonator. In turn, by ensuring that the readout resonator is in sufficient proximity to a corresponding microwave feedline, changes in the resonant frequency of the readout resonator induce changes in the transmission coefficients of the microwave feedline which may be detected externally.

A coupling resonator, or, more generally, a coupling component, allows coupling different qubits together, e.g. as described above, in order to realize quantum logic gates. A coupling component could be comprised of a coupling component on a neighboring qubit, a lumped element capacitor, a lumped element resonator, or a transmission line segment. A coupling transmission line segment (e.g., coupling resonator or bus resonator) is similar to a readout resonator in that it is a transmission line segment that includes capacitive connections to various objects (e.g., qubits, ground, etc.) on both sides (i.e. a half-wavelength resonator), which also results in oscillations within the coupling resonator. Each side/end of a coupling component is coupled (again, either capacitively or inductively) to a respective qubit by being in appropriate location and sufficient proximity to the qubit, namely in sufficient proximity to a first element (or "island") of the qubit that capacitively couples to the coupling component, when the qubit is implemented as a transmon. Because each side of a given coupling component has coupling with a respective different qubit, the two qubits are coupled together through the coupling component. Thus, coupling components may be employed in order to implement multi-qubit interactions.

In some implementations, a microwave line may be used to not only readout the state of the qubits as described above, but also to control the state of the qubits. When a single microwave line is used for this purpose, the line operates in a half-duplex mode where, at some times, it is configured to readout the state of the qubits, and, at other times, it is configured to control the state of the qubits. In other implementations, microwave lines may be used to only readout the state of the qubits as described above, while separate drive lines, may be used to control the state of the qubits. In such implementations, microwave lines used for readout may be referred to as "microwave readout lines," while microwave lines used for controlling the quantum state of the qubits may be referred to as "microwave drive lines." Microwave drive lines may control the state of their respective qubits 102 by providing to the qubits a microwave pulse at or close to the qubit frequency, which in turn stimulates (i.e. triggers) a transition between the states of the qubit. By varying the length of this pulse, a partial transition can be stimulated, giving a superposition of the states of the qubit.

Flux bias lines, microwave lines, readout lines, drive lines, coupling components, and readout resonators, such as e.g. those described above, together form interconnects for supporting propagation of microwave signals. Further, any other connections for providing direct electrical interconnection between different quantum circuit elements and components, such as e.g. connections from electrodes of Josephson Junctions to plates of the capacitors or to superconducting loops of SQUIDs or connections between two ground lines of a particular transmission line for equalizing electrostatic potential on the two ground lines, may also be referred to as interconnects. Still further, the term "interconnect" may also be used to refer to elements providing electrical interconnections between quantum circuit elements and components and non-quantum circuit elements, which may also be provided in a quantum circuit, as well as to electrical interconnections between various non-quantum circuit elements provided in a quantum circuit. Examples of non-quantum circuit elements which may be provided in a quantum circuit may include various analog and/or digital systems, e.g. analog-to-digital converters, mixers, multiplexers, amplifiers, etc.

In various embodiments, various conductive circuit elements of supporting circuitry included in a quantum circuit such as the quantum circuit 100 could have different shapes and layouts. In general, the term "line" as used herein in context of signal lines or transmission lines does not imply straight lines, unless specifically stated so. For example, some resonant or non-resonant transmission lines or parts thereof (e.g. conductor strips of resonant or non-resonant transmission lines) may comprise more curves, wiggles, and turns while other resonant or non-resonant transmission lines or parts thereof may comprise less curves, wiggles, and turns, and some transmission lines or parts thereof may comprise substantially straight lines. At least some of the qubits 102 shown in FIG. 1 may be coupled to associated on-chip demultiplexers that provide respective signals to flux bias lines and microwave drive lines according to any of the embodiments described herein.

The qubits 102, the non-resonant transmission lines 108, and the resonators 110 of the quantum circuit 100 may be provided on, over, or at least partially embedded in a substrate (not shown in FIG. 1). The substrate may be any substrate suitable for realizing quantum circuit assemblies described herein. In one implementation, the substrate may be a crystalline substrate such as, but not limited to a silicon or a sapphire substrate, and may be provided as a wafer or a portion thereof. In other implementations, the substrate may be non-crystalline. In general, any material that provides sufficient advantages (e.g. sufficiently good electrical isolation and/or ability to apply known fabrication and processing techniques) to outweigh the possible disadvantages (e.g. negative effects of spurious TLS's), and that may serve as a foundation upon which a quantum circuit may be built, falls within the spirit and scope of the present disclosure. Additional examples of substrates include silicon-on-insulator (SOI) substrates, III-V substrates, and quartz substrates.

In various embodiments, quantum circuits such as the one shown in FIG. 1 may be used to implement components associated with a quantum IC. Such components may include those that are mounted on or embedded in a quantum IC, or those connected to a quantum IC. The quantum IC may be either analog or digital and may be used in a number of applications within or associated with quantum systems, such as e.g. quantum processors, quantum amplifiers, quantum sensors, etc., depending on the components associated with the IC. The IC may be employed as part of a chipset for executing one or more related functions in a quantum system.

Figure 2:
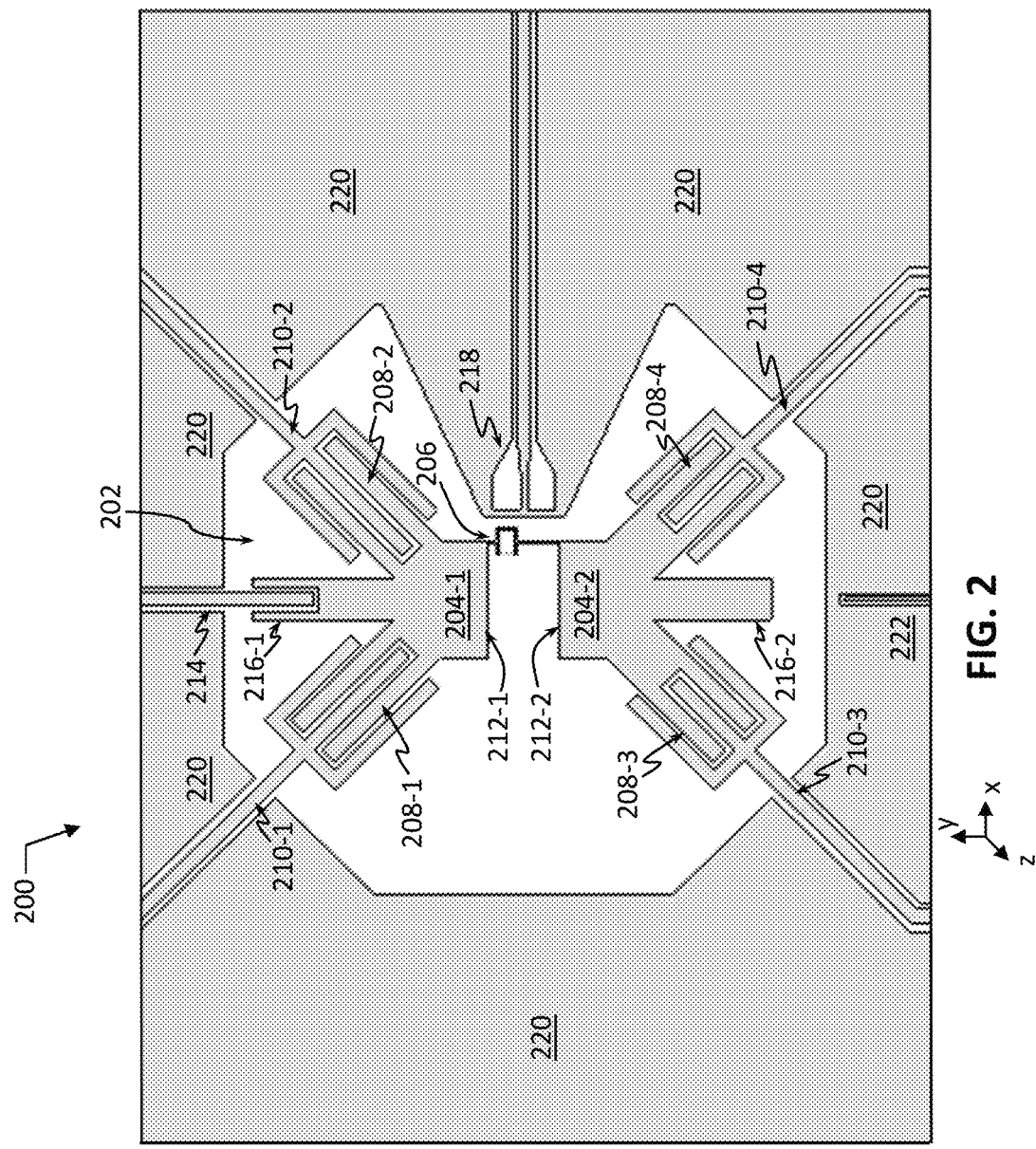
FIG. 2 illustrates an exemplary layout design of a quantum circuit implementing a superconducting qubit device capacitively coupled to 4 nearest neighbor quantum elements, according to some embodiments of the present disclosure.
Figure 3:
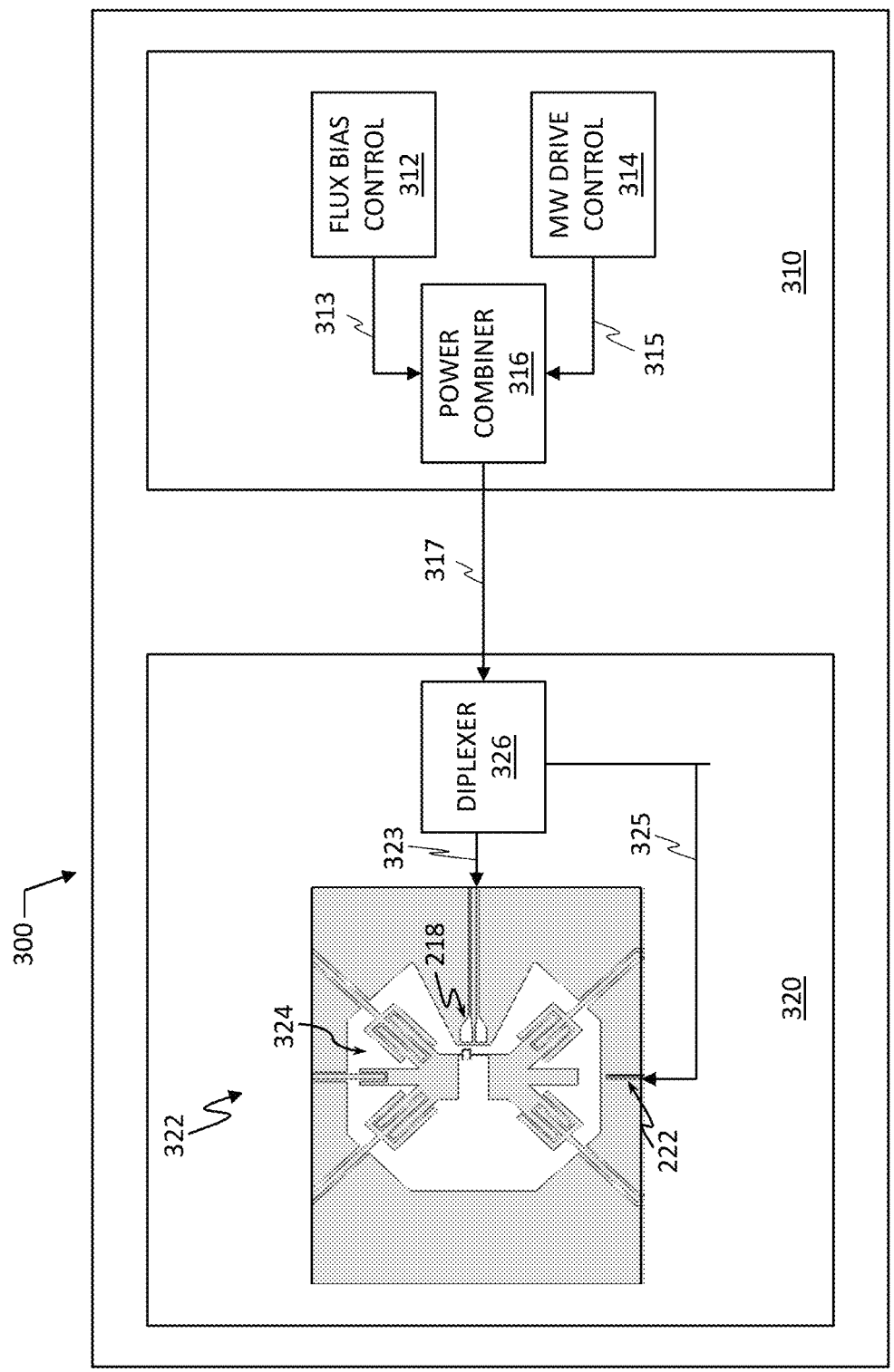
FIG. 3 provides a schematic illustration of an exemplary system where external electronics are coupled to a qubit chip implementing a superconducting quantum circuit and an on-chip demultiplexer, according to some embodiments of the present disclosure.

FIG. 2 illustrates an exemplary layout design of a quantum circuit implementing a superconducting qubit device capacitively coupled to 4 nearest neighbor quantum elements, according to some embodiments of the present disclosure. While FIG. 2, as well as FIGS. 3 and 4, illustrate exemplary layout designs of quantum circuit assemblies where individual superconducting qubits have 4 nearest neighbors, descriptions provided herein are equally applicable to quantum circuit assemblies with superconducting qubits having any other number (any one or more) of nearest neighbors, and that the term "nearest neighbors" refers to neighbors which may be at different distances from a given qubit, as long as they are more highly capacitively coupled to the given qubit than other qubits.

In FIG. 2, the grey portions illustrate elements patterned from an electrically superconductive material (which may include any one or more materials such as e.g. superconductive materials listed above), while the white portions illustrate portions of an insulating material, e.g. portions of the substrate exposed by removal of the superconductive material. At the bottom of FIG. 2 an exemplary coordinate system x-y-z is illustrated so that various dimensions described herein may be referred to a particular axis x, y, or z along which the dimensions are measured. The view of FIG. 2 is of the x-y plane of such a coordinate system.

FIG. 2 illustrates a quantum circuit assembly 200 showing a superconducting qubit device 202. The qubit device 202 may be viewed as including two islands made of a superconductive material, shown in FIG. 2 as a first island 204-1 and a second island 204-2. Each of the two islands 204 has a direct electrical connection to at least one non-linear inductive element such as e.g. a Josephson Junction, but in FIG. 2 each of the two islands is shown to have a direct electrical connection to a SQUID 206 (schematically shown in FIG. 2 as a loop, representing the superconducting loop of a SQUID). In this manner, the first and second islands 204-1 and 204-2 are connected to one another via one or more non-linear inductive elements such as e.g. Josephson Junctions, e.g. via the SQUID 206. In general, as used herein, "islands" refer electrically conductive elements of a given superconducting qubit that are connected to one another via one or more non-linear inductive elements, e.g. Josephson Junctions.

Various portions of the islands 204-1 and 204-2 are labeled in FIG. 2 with their own reference numerals in order to differentiate their functionality from other portions. For example, each of the islands 204-1 and 204-2 include portions 208 used to capacitively couple to an end portion of a respective coupling component, e.g., in this case a coupling resonator formed by a transmission line segment, 210. Thus, FIG. 2 illustrates a portion 208-1 of the first island 204-1 being capacitively coupled to a first coupling resonator 210-1, a portion 208-2 of the first island 204-1 being capacitively coupled to a second coupling resonator 210-2, a portion 208-3 of the second island 204-2 being capacitively coupled to a third coupling resonator 210-3, and a portion 208-4 of the second island 204-2 being capacitively coupled to a fourth coupling resonator 210-4. Each of the coupling resonators 210 may couple the qubit 202 to an individual other superconducting qubit (these further qubits not shown in the view of FIG. 2), and may implement a coupling resonator of the resonators 110 described above.

The interdigitated geometry is schematically illustrated in the layout design shown in FIG. 2 where portions 208 of the qubit 202 are shown to form interdigitated capacitors with the ends of the corresponding coupling resonators 210 which are closest to such portions. While FIG. 2 illustrates each such interdigitated capacitor as having two fingers on the side of the respective portion 208 and having three fingers on the end side of the corresponding coupling resonator 210, in other embodiments, any other number of fingers of interdigitated capacitors may be used. Furthermore, descriptions provided with respect to FIG. 2 are equally applicable to embodiments where e.g. a shape of a portion of any coupling resonator 210 coupled to respective portion 208 of the qubit 202 is meandering (i.e. following a winding course, or comprising a plurality of convex and concave portions) and conformal to a shape of the portion 208, such two portions (i.e. a portion of any coupling resonator 210 and a respective portion 208) separated by a thin gap as to form a capacitor of an interlocking puzzle-piece shape, e.g. an interdigitated capacitor with one or more rounded corners, as well as to embodiments where portions 208 of the qubit 202 and the ends of the corresponding coupling resonators 210 which are closest to such portions form capacitors other than the interdigitated capacitors.

Figure 4A:
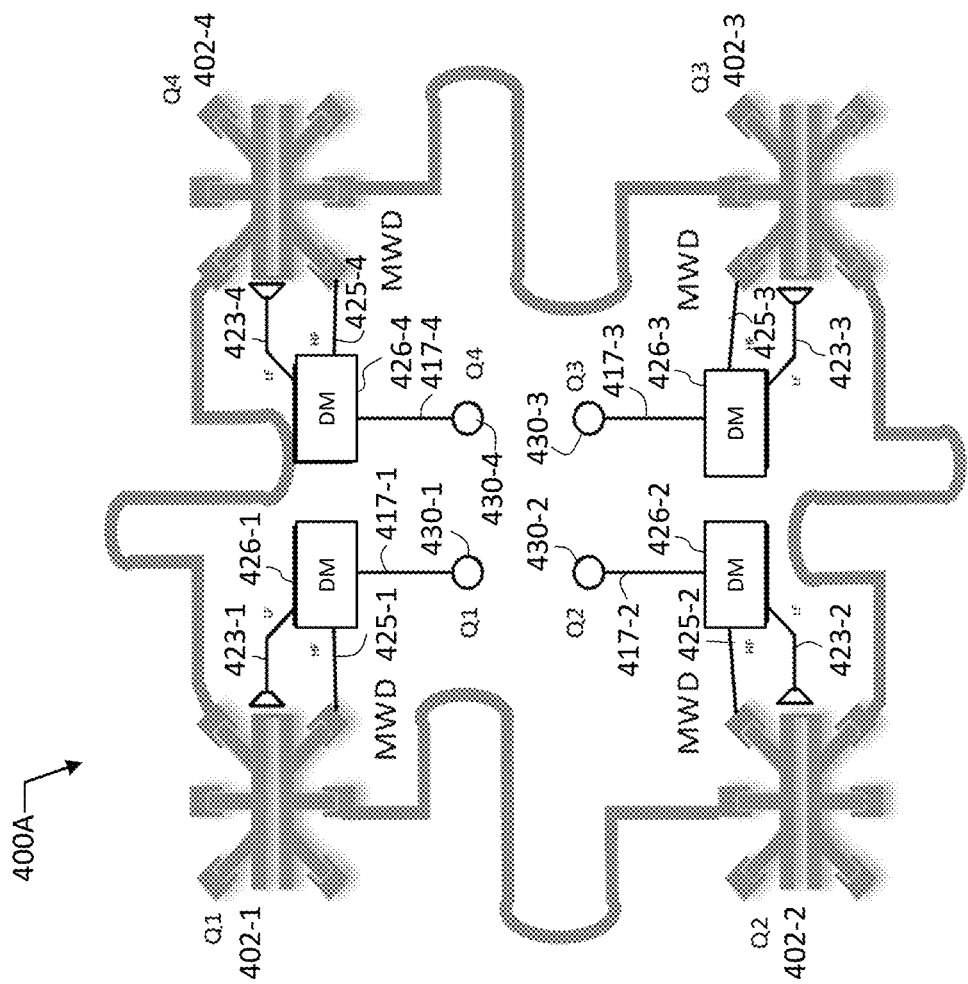
FIGS. 4A-4B illustrate exemplary layout designs of a quantum circuit implementing four superconducting qubit devices and, respectively, individual or shared, demultiplexers, according to various embodiments of the present disclosure.

Also shown in FIG. 2 are portions 212 of each of the islands 204-1 and 204-2, which portions may provide the greatest contribution to the capacitance between the islands 204-1 and 204-2 since portions 212 are opposite one another and are the closest to one another, compared to other portions of the islands 204. Thus, FIG. 2 illustrates a portion 212-1 of the first island 204-1 being opposite to a portion 212-2 of the second island 204-2. In the embodiment shown in FIG. 2, the distance between two such portions 212-1 and 212-2 (i.e. a dimension measured along the y-axis in the coordinate system shown in FIG. 2) is substantially the same across these opposite portions. For example, in various embodiments, the distance between portions 212-1 and 212-2 may be between about 20 and 200 micrometers (um), including all values and ranges therein, e.g. between about 20 and 100 um, or between about 30 and 60 um. However, in other embodiments (not specifically shown in FIGS.), this distance may vary. Furthermore, in the embodiment shown in FIG. 2, portions 212-1 and 212-2 which are facing one another are relatively small, as this may be beneficial for reducing the capacitance between the islands which may be helpful in terms of advantageously increasing coupling strength and decreasing the time it takes two qubits to interact (if the time it takes two qubits to interact is decreased, the likelihood that they can interact before one or both of them decohere increases). For example, in some embodiments, a length of at least one of the portions 212-1 or 212-2 (i.e. a dimension measured along the x-axis of the coordinate system shown in FIG. 2) may be between about 1 and 500 um, including all values and ranges therein, e.g. between about 50 and 150 um, or between about 80 and 120 um. However, in some embodiments, the portions 212-1 and 212-2 may extend longer in the direction of the x-axis of the coordinate system shown in FIG. 2, as is illustrated in FIG. 4A showing four superconducting qubits each of which is similar to the qubit 202 shown in FIG. 2.

FIG. 2 further illustrates a readout resonator 214, capacitively coupled to a portion 216-1 of the first island 204-1. The readout resonator 214 may be a readout resonator of the resonators 110 described above. For symmetry, as shown in FIG. 2, in some embodiments the second island 204-2 may also have a similar portion 216-2, which may be coupled to a microwave drive line 222, for controlling the state of the qubit. In other embodiments, the coupling resonators 210, the readout resonators 214, and the microwave drive lines 222 may be arranged differently with respect to the qubit 202, e.g. based on routing requirements for a particular implementation. For example, this arrangement is different in the illustration of FIG. 4A where e.g. the superconducting qubit shown in the upper left portion of FIG. 4A is substantially similar to the qubit 202 shown in FIG. 2 except that locations where the microwave drive line 222 and the coupling resonator 210-4 of FIG. 2 are coupled to the qubit 202 are interchanged. In various embodiments, the microwave drive line 222 may be a microwave drive line of the non-resonant transmission lines 108 described above.

FIG. 2 further illustrates a flux bias line 218 provided in the vicinity of the SQUID 206 in order to tune the frequency of the qubit 202, as described above with reference to FIG. 1. The flux bias line 218 may be a flux bias line of the non-resonant transmission lines 108 described above. Finally, FIG. 2 also illustrates ground planes 220, i.e. portions of electrically conductive, preferably superconductive, material connected to the ground or some other reference potential, surrounding the qubit 202.

Including On-Chip Demultiplexers in Superconducting Quantum Circuit Assemblies While the layout design of the quantum circuit assembly 200 already provides substantial advantages over conventional layout designs of superconducting qubits, further improvements could be made. One such improvement is based on a realization of the inventors of the present disclosure that both the flux bias line and the microwave drive line carry microwave signals to a superconducting qubit, although in different frequency ranges, and that this may be used to reduce the number of lines extending between external electronics and a chip with a die on which a superconducting quantum circuit is implemented. Namely, flux bias lines typically carry signals having frequency less than about 1 GHz, while microwave drive lines typically carry signals which are closer to the qubit frequency, e.g. between about 3 and 8 GHz, e.g. between about 4 and 7 GHz. Similarly, microwave drive lines associated with different qubits may also typically carry signals in different frequency ranges. Embodiments of the present disclosure use this unique relation between the different frequency ranges provided over at least some of the lines to one or more qubits to advantageously reduce the number of IO lines extending between the qubit chip and the external electronics by combining two or more signals of different frequency ranges that are to be applied to different lines of one or more qubits at the external electronics using a power combiner, and then separating the signals of different frequency ranges at the qubit chip using a demultiplexer. For example, a power combiner may combine a signal to be applied to a flux bias line and a signal to be applied to a microwave drive line of a single qubit or/and combine a signal to be applied to a microwave drive line of a first qubit and a signal to be applied to a microwave drive line of a second qubit. A demultiplexer may then be configured to demultiplex the different signals combined into the combined signal by the power combiner and provide respective demultiplexed signals to one or more qubits, as needed.

Figure 4B:
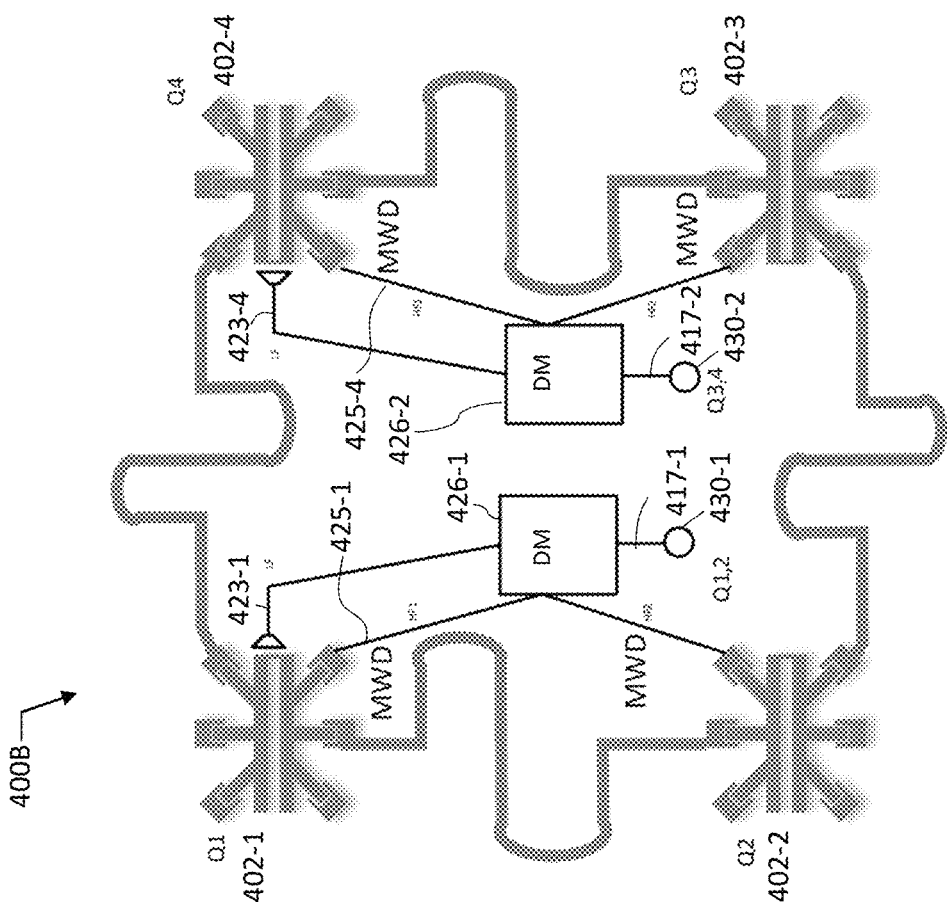

In general, a quantum circuit assembly that typically includes a plurality of qubits may include one or more such demultiplexers. In some embodiments, at least some of the plurality of qubits may have a different/individual demultiplexer associated with it, i.e. for such qubits, a given demultiplexer may be configured to demultiplex and provide signals in different frequency ranges, over different lines, to a single qubit (e.g. provide first and second signals in different frequency ranges to, respectively, flux bias line and microwave drive line of a single qubit). Such demultiplexers may be seen as being one "designated" demultiplexer for one individual qubit. Examples of such implementations are shown in FIG. 3 and FIG. 4A. In other embodiments, at least some of the demultiplexers may be shared among two or more qubits. Thus, in such embodiments, a given demultiplexer may be configured to provide signals in different frequency ranges to different qubits (e.g. provide first and second signals in different frequency ranges to microwave drive lines of, respectively, a first qubit and a second qubit). In some embodiments, a given demultiplexer may be configured to both, provide signals in different frequency ranges, over different lines, to a single qubit, and provide at least one other signal in yet another frequency range, to another qubit. Example of such implementation is shown in FIG. 4B.

FIG. 3 provides a schematic illustration of an exemplary system 300 where external electronics 310 are coupled to a qubit chip 320, according to some embodiments of the present disclosure. The qubit chip 320 is an IC package that, during operation, would be subject to being cooled by a cooling apparatus, e.g. by being placed in a dilution refrigerator. On the other hand, the external electronics 310 would operate outside of the cooling apparatus, typically at room temperature, and be communicatively and electrically connected to the qubit chip 320 as known in the art.

As shown in FIG. 3, the qubit chip 320 includes a quantum circuit assembly 322 with at least one qubit device 324, e.g. at least one superconducting qubit device 324, according to some embodiments of the present disclosure. The superconducting qubit device 324 may be implemented as the superconducting qubit device 202 shown in FIG. 2, which descriptions, therefore, in the interests of brevity, are not repeated here. Also, the reference numerals shown in FIG. 2 are not all shown in FIG. 3 in order to not clutter the drawing, but are understood to be the same as shown in FIG. 2. In addition to the superconducting qubit device 324, the quantum circuit assembly 322 further includes at least one on-chip demultiplexer 326. The diplexer 326 may be implemented either on the same substrate as the superconducting qubit device 324 or on a different substrate, as long as both are implemented within a single qubit chip 320 coupled to the external electronics 310. The substrate on which one or more qubit devices 324 are implemented may be referred to as a "qubit substrate" or a "qubit die." If different from the qubit substrate, the substrate on which one or more diplexers 326 are implemented may be referred to as a "diplexer substrate" or a "diplexer die." The qubit and diplexer dies may be coupled to one another via a package substrate (not specifically shown in FIG. 3) of the qubit chip 320.

In general, the external electronics 310 include components suitable for providing power and signals to various components of the qubit chip 320, e.g. via a package substrate of the qubit chip 320. As shown in FIG. 3, the external electronics 310 include at least flux bias control 312, microwave (MW) drive control 314, and a power combiner 316. Each of the flux bias control 312 and the MW drive control 314 may include radiofrequency (RF) circuits (where the term "circuits" includes any suitable circuits, units, modules, or/and devices) capable of generating RF pulses in the desired frequency ranges, and may further include associated control logic for controlling functionality of such circuits. In some embodiments, such RF circuits may be implemented using digital circuits and digital to analog converters to convert the digital signals into RF pulses. The flux bias control 312 is configured to generate a flux bias signal 313 and provide it to the power combiner 316, while the MW drive control 314 is configured to generate a microwave drive signal 315 and provide it to the power combiner 316 as well. The flux bias signal 313 and the MW drive signal 315 may both be microwave signals, but in different frequency ranges. Namely, the flux bias signal 313 may be a signal having frequency below about 1 GHz, while the MW drive signal 315 may be a signal having frequency above about 2 GHz, e.g. between about 3 and 8 GHz, including all values and ranges therein, e.g. between about 4 and 7 GHz.

The power combiner 316 is configured to combine the signals 313 and 315, thus generating a combined signal 317 that includes both of the signals 313 and 315. To that end, the power combiner 316 may be implemented as a T-junction, T-junction with filters, multi-tap transformers or a Wilkinson power combiner. The combined signal 317 may then be provided from the power combiner 316 to the diplexer 326 on the qubit chip 320. In turn, the diplexer 326 is configured to perform frequency separation on the received combined signal 317 to generate a first signal 323 indicative (e.g. including) the flux bias signal 313, and to general a second signal 325 indicative (e.g. including) the MW drive signal 315. Thus, the first signal 323 may be a signal in the frequency range similar to that of the flux bias signal 313, while the second signal 325 may be a signal in the frequency range similar to that of the MW drive signal 315. The first signal 323 may then be applied to the flux bias line 218 of the qubit device 324 in order to control the frequency of the qubit device 324 (where said control of the frequency may be carried out e.g. as described above), while the second signal 325 may then be applied to the microwave drive line 222 of the qubit device 324 in order to control a quantum state of the qubit device 324, e.g. the second signal 325 may be configured to set a state of the qubit device 324 (where said control of the state may be carried out e.g. as described above).

In various embodiments, the diplexer 326 may include any means suitable for performing frequency separation on the combined signal 317 to generate the first and second signals 323, 325, indicative, respectively, of the flux bias signal 313 and the MW drive signal 315 contained in the combined signal 317. There are many possible ways how the diplexer 326 may separate the first and second signals 323, 325, some of which are described below but all of which being within the scope of the present disclosure.

In some embodiments, the diplexer 326 may include a low-pass filter (LPF) configured to filter the combined signal 317 to suppress or eliminate frequency components above a certain frequency threshold (which may be referred to as an "LPF threshold"), e.g. above about 2 GHz, or above about 1 GHz. As a result of applying such a filter to the combined signal 317, frequency components above the LPF threshold are attenuated (i.e. at least reduced or possibly altogether eliminated), leaving substantially only frequency components below the threshold, which could be one way to generate the first signal 323. The second signal 325 may then be generated by subtracting the first signal 323 from the combined signal 317, i.e. the diplexer 326 may generate the second signal 325 as the combined signal 317 without the components having the frequency below said LPF threshold. In other words, in some embodiments, the combined signal 317 filtered of all of the components having frequencies below the LPF threshold may be designated as the second signal 325 (i.e. the signal applied to the microwave drive line). In other embodiments, the second signal 325 may be generated by the diplexer 326 including a high pass filter (HPF) configured to filter the combined signal 317 to suppress or eliminate frequency components below a certain frequency threshold (which may be referred to as an "HPF threshold"), where the HPF threshold may be equal to or greater than the LPF threshold. For example, in various embodiments, the HPF threshold may be about 1 GHz, e.g. about 2 GHz or about 3 GHz. In this manner, the diplexer 326 may separate from the combined signal 317 components having a frequency above the HPF threshold. In other words, in some embodiments, the second signal 325 may be generated by selecting from the combined signal 317 components having frequencies above the HPF threshold, i.e. in such embodiments the combined signal 317 is filtered of components which do not have frequencies above that threshold.

In other embodiments, the diplexer 326 may include the HPF as described above, configured to generate the second signal 325, i.e. the second signal 325 includes frequency components, separated from the combined signal 317, that are above the HPF threshold, and the first signal 323 may then be generated as the combined signal 317 without the components having the frequency above the HPF threshold. In other words, in some embodiments, the combined signal 317 filtered of all of the components having frequencies above the HPF threshold may be designated as the first signal 323 (i.e. the signal applied to the flux bias line).

In various embodiments, the diplexer 326 may be implemented in many different forms known in the art.

For example, in some embodiments, the diplexer 326 may be implemented as an LC-based diplexer which may include a T-junction, connecting to a high-pass LC filter (e.g. a single stage series capacitance and a parallel inductance to the ground or multiple stages) and a low-pass LC filter (e.g. a single stage series inductance and a parallel capacitance to the ground or multiple stages). In some embodiments, the capacitors may be implemented as interdigitated capacitors or as metal insulator metal (MIM) capacitors. In some embodiments, the inductors may be implemented as spiral lines or meandered traces.

In other embodiments, the diplexer 326 may be implemented as a transmission line based diplexer where instead of discrete LC elements, the filtering is done through transmission line elements such as high-impedance and low-impedance transmission lines or stub lines. For example, similar to coplanar waveguide (CPW) technology, the LPFs may be implemented using multiple sections of narrow (i.e., high-impedance) and wide (i.e., low-impedance) CPW line portions. An HPF may be implemented using an interdigitated capacitor in series with a narrow (i.e., high-impedance) CPW line portion.

In yet other embodiments, the diplexer 326 may be implemented as an active diplexer comprising one or more Josephson Junctions e.g. by using the Josephson Junctions as a series inductance element. Such Josephson Junctions may be designed differently compared to the ones used in the superconducting qubits since, in this case, the Josephson Junctions should be configured to remain relatively linear over a wide power range.

Still further, in some embodiments, the diplexer 326 may be implemented as is an acoustic wave filter based diplexer (e.g. surface acoustic wave or bulk acoustic wave) where the electrical signals are converted to acoustic waves and filtered through acoustic filters then converted back to electrical. In some embodiments, the electrical to/from acoustic conversion can be done using the piezoelectric effect or Lorentz force to convert electrical signals into mechanical waves.

As mentioned above, in various embodiments, the diplexer 326 may be provided on the same substrate as the qubit device 324, or on a different substrate included within the qubit chip 320 and coupled to the substrate of the qubit device 324 in a manner so that the diplexer 326 can provide the first signal 323 to the flux bias line 218 and the second signal 325 to the microwave drive line 222 of the qubit device 324.

In the embodiments where the diplexer 326 is provided on the same substrate as the qubit device 324, the diplexer 326 may either be provided on the same face of the substrate as the qubit device 324, or on the opposite face. The latter implementation may be particularly advantageous because it would allow saving space on one face of the substrate for implementing more qubit devices (i.e. all qubit devices of the qubit die may be implemented on one face of the substrate, but all of the associated diplexers may be implemented on the other face). In some embodiments where multiple qubit devices and multiple diplexers as described herein are implemented, some of the qubit devices and diplexers may be provided on the same face of a substrate, while some other ones may be provided on the opposite faces. When a diplexer associated with a given qubit device is provided on the opposite face of the qubit substrate, the diplexer may be coupled to the qubit device by through-silicon-vias (TSVs). Although the term "through-silicon vias" may be used in the present disclosure to refer to conductive pathways through substrates, in this case e.g. through qubit the substrate, this is simply a term of art, and any substrates described to have TSVs may be formed of materials other than silicon (e.g. other crystalline materials such as quartz or non-crystalline materials with sufficiently low amounts of spurious TLSs in the desired frequency range, e.g. Teflon).

In the embodiments where the diplexer 326 is provided on a different substrate as the qubit device 324, a package substrate of the qubit chip 320 may be used to couple the qubit substrate with the diplexer substrate (i.e. qubit device components implemented on the first substrate may be coupled to components of the diplexer implemented on the second substrate via the package substrate). Alternatively, the diplexer substrate may be coupled directly to the qubit substrate (i.e. not via the package substrate), and one or both of these substrates may be coupled to a package substrate of the qubit chip 320. Thus, in various embodiments, the diplexer 326 may be implemented on a die different from that on which the qubit device is implemented, but in a single chip with the qubit die, and may be coupled to the same package substrate as the qubit die or/and be coupled directly to the qubit die.

Embodiments described above refer to a quantum circuit assembly showing a single qubit device and a single diplexer, or, in general, a single demultiplexer. In some embodiments, multiple qubit devices may be implemented on a single substrate. In such embodiments, a plurality of demultiplexers as described above may be implemented, where each one of the plurality of qubit devices like the qubit device 324 may have a different one of the plurality of demultiplexers, e.g. the diplexer 326, associated with it. In this context, the "association" may be in that a given diplexer is configured to provide first and second signals 323, 325 as described herein to, respectively, a flux bias line and a microwave drive line of a given qubit device associated with the diplexer, i.e. there may be a one-to-one correspondence between qubit devices and demultiplexers so that each qubit device is associated with a different one of the demultiplexers, and vice versa, an example of which is described below with reference to FIG. 4A. In other embodiments, at least one of the plurality of demultiplexers may be associated with two or more of the plurality of qubit devices. In this context, the "association" may be in that a given demultiplexer may be configured to provide first and second signals 323, 325 as described herein to, for example, respectively, a flux bias line and a microwave drive line of each of two or more qubit devices, i.e. there may be a one-to-many correspondence between demultiplexers and qubit devices, where two or more qubit devices may be associated with a single one of the demultiplexers. In general, a given demultiplexer may provide signals of different frequency ranges to one or more qubit devices, an example of such a demultiplexer providing signals to two qubit devices is described below with reference to FIG. 4B.

FIG. 4A illustrates an exemplary layout design of a quantum circuit assembly 400A implementing four superconducting qubit devices and their respective demultiplexers identified as "DM" 426, in the example shown—diplexers, according to some embodiments of the present disclosure. Each of the four superconducting qubit devices are indicated in FIG. 4A as qubit devices Q1 402-1, Q2 402-2, Q3 402-3, and Q4 402-4, each of which could be the qubit device 324 as described above. Each of the four respective diplexers are indicated in FIG. 4A as diplexers 426-1, 426-2, 426-3, and 426-4, each of which could be the diplexer 326 as described above. In the embodiment shown in FIG. 4A, there is a one-to-one correspondence between the qubit devices 402 and the diplexers 426 in that each one of the diplexers 426 provides first and second signals 423 and 425, analogous to the first and second signals 323 and 325 as described above, to one and only one different qubit device 402, where the first and second signals 423 and 425 are generated from the respective combined signals 417 received by the diplexers 426, the combined signals 417 being analogous to the combined signal 317 described above. Thus, the first diplexer 426-1 is configured to receive a combined signal 417-1 and, based on the combined signal 417-1, generate a first signal 423-1 that is then provided to a flux bias line of the first qubit Q1 in order to control the frequency of the first qubit Q1, and generate a second signal 425-1 that is then provided to a microwave drive line of the first qubit Q1 in order to control the state of the first qubit Q1, as shown in FIG. 4A. The second diplexer 426-2 is configured to receive a combined signal 417-2 and, based on the combined signal 417-2, generate a first signal 423-2 that is then provided to a flux bias line of the second qubit Q2 in order to control the frequency of the second qubit Q2, and generate a second signal 425-2 that is then provided to a microwave drive line of the second qubit Q2 in order to control the state of the second qubit Q2, as shown in FIG. 4A. The third diplexer 426-3 is configured to receive a combined signal 417-3 and, based on the combined signal 417-3, generate a first signal 423-3 that is then provided to a flux bias line of the third qubit Q3 in order to control the frequency of the third qubit Q3, and generate a second signal 425-3 that is then provided to a microwave drive line of the third qubit Q3 in order to control the state of the third qubit Q3, as shown in FIG. 4A. Finally, the fourth diplexer 426-4 is configured to receive a combined signal 417-4 and, based on the combined signal 417-4, generate a first signal 423-4 that is then provided to a flux bias line of the fourth qubit Q4 in order to control the frequency of the fourth qubit Q4, and generate a second signal 425-4 that is then provided to a microwave drive line of the fourth qubit Q4 in order to control the state of the fourth qubit Q4, as shown in FIG. 4A. As also shown in FIG. 4A, when such on-chip demultiplexers are implemented in the quantum circuit assembly 400A, only four connections from the external circuitry, the connections shown in FIG. 4A as connections 430-1, 430-2, 430-3, and 430-4, are needed to be able to provide suitable flux bias and microwave drive signals to the four qubits.

FIG. 4B illustrates an exemplary layout design of a quantum circuit assembly 400B implementing four superconducting qubit devices and two exemplary demultiplexers shared among at least some of the qubit devices, according to some embodiments of the present disclosure. Similar to FIG. 4A, each of the four superconducting qubit devices are indicated in FIG. 4B as qubit devices Q1 402-1, Q2 402-2, Q3 402-3, and Q4 402-4, each of which could be the qubit device 324 as described above. Each of the two respective demultiplexers are indicated in FIG. 4B as demultiplexers DM 426-1 and 426-2, each of which could be a demultiplexer as the diplexer 326 but configured to separate more than two signals in different frequency ranges. In the embodiment shown in FIG. 4B, there is a one-to-many correspondence between the qubit devices 402 and the demultiplexers 426 in that each one of the demultiplexers 426 may provide signals to at least two different qubits devices 402. Namely, the example shown in FIG. 4B illustrates that the first demultiplexer 426-1 may provide first and second signals 423-1 and 425-1 to different lines of the first qubit device 402-1, and further provides a third signal 425-2 to the second qubit device 402-2. For example, the first and second signals 423-1 and 425-1 may be analogous to the first and second signals 323 and 325 as described above (i.e. flux bias and microwave drive signals for the first qubit 402-1), while the third signal 425-2 may be analogous to the second signal 325 as described above but for the second qubit 402-2 (i.e. microwave drive signal for the second qubit 402-2). Similarly, the example shown in FIG. 4B illustrates that the second demultiplexer 426-2 may provide first and second signals 423-4 and 425-4 to different lines of the fourth qubit device 402-4, and further provides a third signal 425-3 to the third qubit device 402-3. For example, the first and second signals 423-4 and 425-4 may be analogous to the first and second signals 323 and 325 as described above (i.e. flux bias and microwave drive signals for the fourth qubit 402-4), while the third signal 425-3 may be analogous to the second signal 325 as described above but for the third qubit 402-3 (i.e. microwave drive signal for the third qubit 402-3). Each of the demultiplexers 426-1 and 426-2 generates their first, second, and third signals from the respective combined signals 417-1 and 417-2 received by the diplexers 426, the combined signals 417 being analogous to the combined signal 317 described above but this time with signals of 3 different frequency ranges. Thus, the first diplexer 426-1 may be configured to receive a combined signal 417-1 and, based on the combined signal 417-1, generate the first signal 423-1 that is then provided to a flux bias line of the first qubit Q1 in order to control the frequency of the first qubit Q1, generate the second signal 425-1 that is then provided to a microwave drive line of the first qubit Q1 in order to control the state of the first qubit Q1, and generate the third signal 425-2 that is then provided to a microwave drive line of the second qubit Q2 in order to control the state of the second qubit Q2, as shown in FIG. 4B. The second diplexer 426-2 is configured to receive a combined signal 417-2 and, based on the combined signal 417-2, generate the first signal 423-4 that is then provided to a flux bias line of the fourth qubit Q4 in order to control the frequency of the fourth qubit Q4, generate the second signal 425-2 that is then provided to a microwave drive line of the fourth qubit Q4 in order to control the state of the fourth qubit Q4, and generate the third signal 425-3 that is then provided to a microwave drive line of the third qubit Q3 in order to control the state of the third qubit Q3, as shown in FIG. 4B. As also shown in FIG. 4B, when such on-chip demultiplexers are implemented in the quantum circuit assembly 400B, only two connections from the external circuitry, the connections shown in FIG. 4B as connections 430-1 and 430-2, are needed to be able to provide suitable flux bias and microwave drive signals to the four qubits. The example shown in FIG. 4B is purely illustrative, an, in general, any number of demultiplexers as described herein may be used to provide different signals to any one or more qubits as described herein, as long as the signal provided over different lines (to any one or more qubits) can be separated based on their different frequency ranges. For example, in some embodiments, the demultiplexers 426 as shown in FIG. 4B may be configured to only provide microwave drive signals to different qubits, but not flux bias line signals as shown in FIG. 4B. In another example, in some embodiments, at least one of the demultiplexers 426 as shown in FIG. 4B may be configured to provide microwave drive signals to more than two different qubits. Many other modifications are possible, all of which are within the scope of the present disclosure.

It should be noted that in the illustrations of FIGS. 4A-4B, the connections 430 illustrate only signal/power connections, and each of the connections shown with a dot may further include other connections, e.g. to provide electrical connectivity to a ground or any reference potential, as known in the field of microwave transmission.

In various embodiments, quantum circuit assemblies shown in FIGS. 2-4 can vary significantly to achieve equivalent or similar results, and, therefore, should not be construed as the only possible implementations of quantum circuit assemblies where one or more diplexers for delivering flux bias and microwave drive signals may be used, in accordance with the concepts described herein. Some of the possible variations and implementations of embodiments of the present disclosure compared to those shown in FIGS. 2-4 are described above alongside with the description of these FIGS., and some other possible variations and implementations are listed below. However, any of the variations and implementations which leverage the use of one or more on-chip demultiplexers in accordance with the concepts described herein are within the scope of the present disclosure.

While FIGS. 2-4 illustrate exemplary layout designs of quantum circuit assemblies where individual superconducting qubits may be coupled to four nearest neighbors, in other embodiments any other number of nearest neighbor qubits may be implemented, e.g. qubit devices as shown in FIGS. 2-4, and various other embodiments of such devices described herein, may be coupled to any number of 2 or more, e.g. 3 or more, nearest neighbor qubit devices using at least some of the coupling components as described herein.

While FIGS. 2-4 illustrate exemplary layout designs of quantum circuit assemblies implementing two Josephson Junctions in a SQUID, descriptions provided herein are equally applicable to quantum circuit assemblies where at least some of the superconducting qubits implement only one Josephson Junction and no SQUID.

For each of FIGS. 2-4, the flux bias line 218, the microwave drive line 222, and readout resonator 214 do not need not be provided in the same plane as the qubit islands, as shown in these FIGS., but could be provided in different planes. Thus, any of the flux bias line 218, the microwave drive line 222, and readout resonator 214 could be situated in/on a plane of different z-value (either above or below) the qubit plane. For example, the microwave drive line 222 and readout resonator 214 could couple to respective portions of the qubit islands through an out-of-plane parallel-plate capacitive geometry, as described for the coupling bus resonators above.

Fabrication Methods

Figure 5:
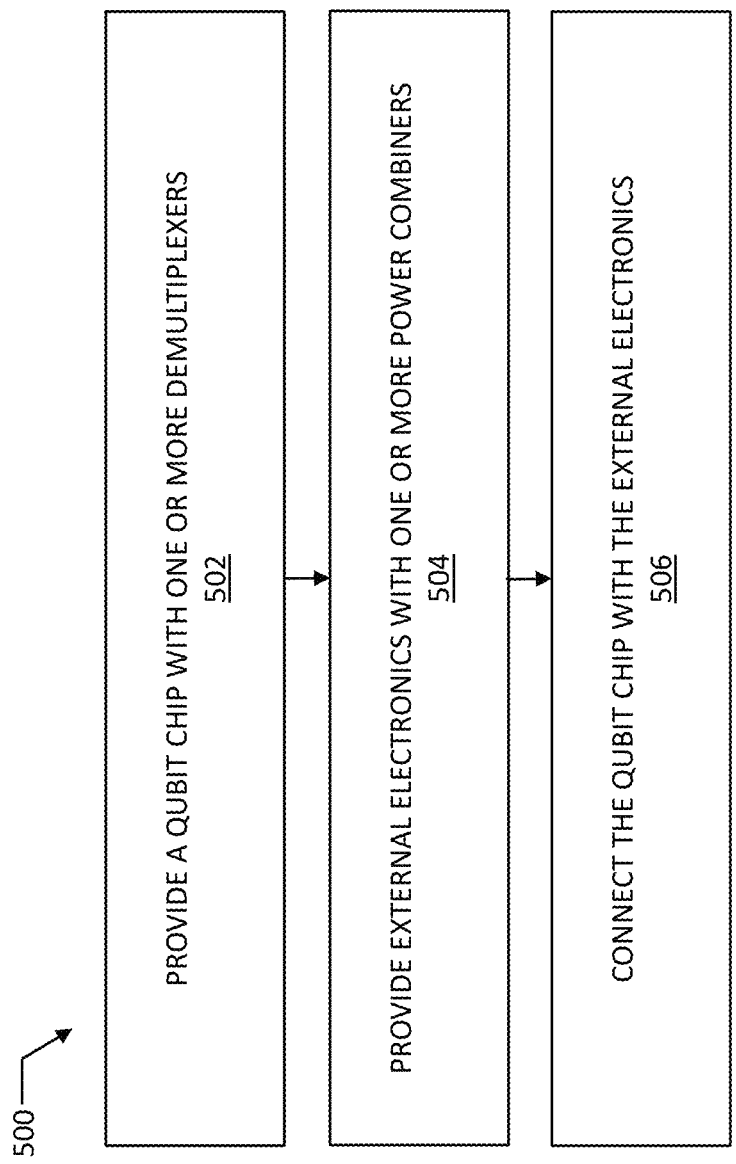
FIG. 5 provides a flow chart of a method for fabricating a quantum circuit assembly with one or more on-chip demultiplexers, according to some embodiments of the present disclosure.

Various quantum circuit assemblies as discussed herein may be fabricated using any suitable fabrication methods. FIG. 5 provides a flow chart of one such method, a method 500 for fabricating quantum circuit assemblies with one or more on-chip demultiplexers in accordance with various embodiments described herein. Various operations of the method 500 may refer to some specific exemplary embodiments discussed above, but the method 500 may be used to manufacture any suitable quantum circuit assemblies with one or more on-chip demultiplexers in accordance with any of the embodiments described herein.

Although the operations of the method 500 are illustrated in FIG. 5 once each and in a particular order, the operations may be performed in any suitable order and repeated as desired. For example, one or more operations may be performed in parallel to manufacture multiple quantum circuit assemblies as described herein substantially simultaneously. In another example, the operations may be performed in a different order to reflect the architecture of a particular quantum circuit component in which one or more quantum circuit assemblies with one or more superconducting qubits and one or more on-chip demultiplexers are to be included. In addition, the manufacturing method 500 may include other operations, not specifically shown in FIG. 5, such as e.g. various cleaning operations as known in the art. For example, in some embodiments, any of the substrates/assemblies may be cleaned prior to or/and after any of the processes of the method 500 described herein, e.g. to remove surface-bound oxide, organic, and/or metallic contaminants, as well as subsurface contamination. In some embodiments, cleaning may be carried out using e.g. a chemical solutions (such as peroxide), and/or with ultraviolet (UV) radiation combined with ozone, and/or oxidizing the surface (e.g., using thermal oxidation) then removing the oxide (e.g. using hydrofluoric acid (HF)).

As shown in FIG. 5, the method 500 may include a process 502 in which a qubit chip with one or more demultiplexers as described herein is provided. The qubit chip provided in the process 502 may include any embodiments of the qubit chip 320 described herein. The process 502 may include providing a qubit die with one or more qubit devices using any suitable fabrication techniques as known in the art. Such fabrication techniques may involve any number of deposition and patterning processes where layers of various materials, e.g. superconductive materials, may be deposited, and possibly patterned, over a substrate. Examples of suitable deposition techniques include atomic layer deposition (ALD), physical vapor deposition (PVD) (e.g. evaporative deposition, magnetron sputtering, or e-beam deposition), chemical vapor deposition (CVD), or electroplating. Examples of suitable patterning techniques include photolithographic or electron-beam (e-beam) or optical patterning, possibly in conjunction with a dry etch, such as e.g. radio frequency (RF) reactive ion etch (RIE) or inductively coupled plasma (ICP) RIE, to pattern the layer of electrically conductive, e.g. superconductive, materials into structures of the specified geometries for a given implementation, e.g. to form the islands 204, the coupling components 210, the ground planes 220, the flux bias lines 218, the microwave drive lines 222, and various other transmission lines described herein.

The method 500 may also include a process 504, which may be performed before, substantially with, or in any overlapping manner with the process 502, i.e. which may be performed in any order and not necessarily in the order shown in FIG. 5. In the process 504, external electronics with one or more power combiners may be provided. The external electronics provided in the process 504 may include any embodiments of the external electronics 310 described herein.

Next, in a process 506, the qubit chip provided in the process 502 may be connected to the external electronics provided in the process 504 in any manner suitable for provision of power and signaling from the external electronics and the qubit chip.

Exemplary Qubit Devices

Quantum circuit assemblies/structures with one or more superconducting qubits and one or more on-chip demultiplexers arranged in any of the layout designs as described above may be included in any kind of qubit devices or quantum processing devices/structures. Some examples of such devices/structures are illustrated in FIGS. 6A-6B, 7, and 8.

FIGS. 6A-6B are top views of a wafer 1100 and dies 1102 that may be formed from the wafer 1100, according to some embodiments of the present disclosure. The wafer 1100 may include semiconductor material and may include one or more dies 1102 having conventional and quantum circuit device elements formed on a surface of the wafer 1100. Each of the dies 1102 may be a repeating unit of a semiconductor product that includes any suitable conventional and/or quantum circuit qubit device. After the fabrication of the semiconductor product is complete, the wafer 1100 may undergo a singulation process in which each of the dies 1102 is separated from one another to provide discrete "chips" of the semiconductor product.

In some embodiments, different ones of the die 1102 may include any of the quantum circuit assemblies with one or more qubit devices and one or more demultiplexers as described herein (i.e. in these embodiments the one or more demultiplexers may be implemented on the same die as the one or more qubit devices), e.g., the quantum circuit assemblies 200, 322, or 400 (i.e. 400A or/and 400B), or any further embodiments of these assemblies as described herein (e.g. quantum circuit assemblies as shown in FIGS. 2-4 but with different numbers of nearest neighbor qubits, etc.), or any combinations of these assemblies. In other embodiments, at least some of the dies 1102 may include only one or more qubit devices or one or more demultiplexers as described herein (i.e. in these embodiments the one or more demultiplexers may be implemented on a different die than that with the one or more qubit devices), e.g., some of the dies 1102 may include one or more demultiplexers 326, 426, or any further embodiments of these demultiplexers as described herein, while some other ones of the dies 1102 may include the one or more qubit devices as described herein, e.g., one or more of the qubit devices 202, 324, 402, or any further embodiments of the qubit devices as described herein (e.g. qubit devices as shown in FIGS. 2-4 but with different numbers of nearest neighbor qubits, etc.), or any combinations of these qubit devices. In various embodiments, at least some of the dies 1102 may include other IC components. In some embodiments, the wafer 1100 or the die 1102 may include a memory device (e.g., a static random access memory (SRAM) device), a logic device (e.g., AND, OR, NAND, or NOR gate), or any other suitable circuit element. Multiple ones of these devices may be combined on a single die 1102. For example, a memory array formed by multiple memory devices may be formed on a same die 1102 as a processing device (e.g., the processing device 2002 of FIG. 8) or other logic that is configured to store information in the memory devices or execute instructions stored in the memory array.

Figure 7:
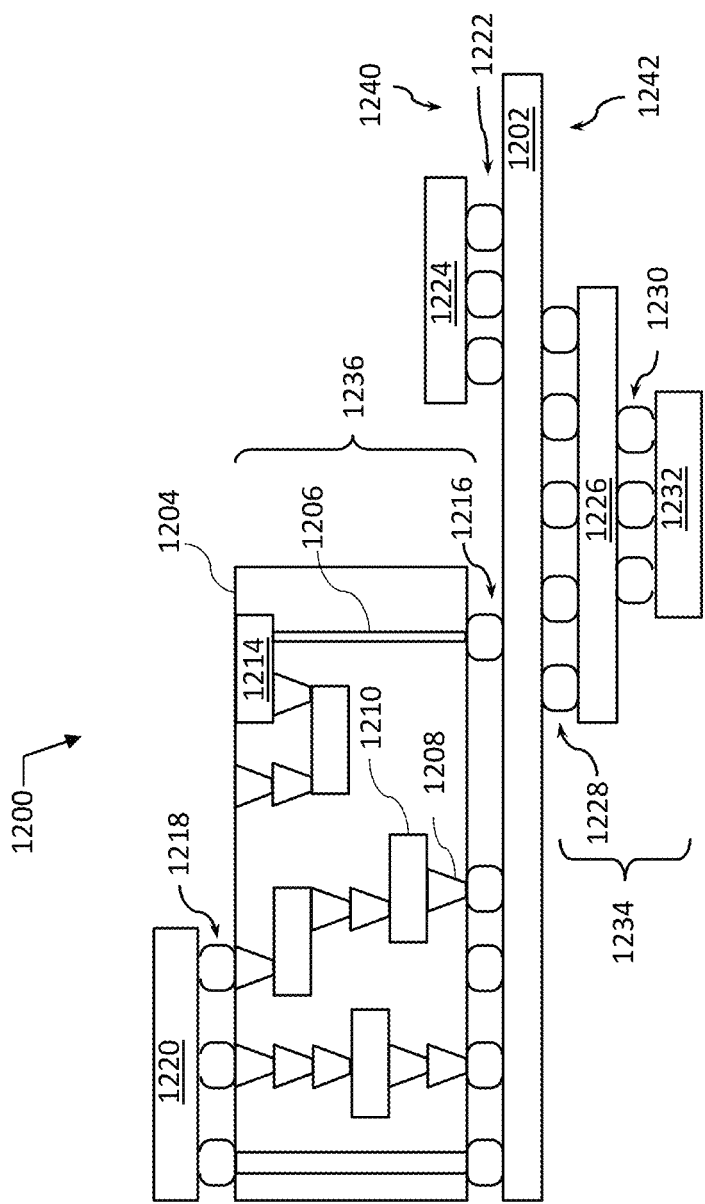
FIG. 7 is a schematic cross-sectional side view of a device assembly that may include one or more of quantum circuit assemblies with superconducting qubits and on-chip demultiplexers, according to some embodiments of the present disclosure.

FIG. 7 is a cross-sectional side view of a device assembly 1200 that may include any of the quantum circuit assemblies with one or more superconducting qubits and one or more on-chip demultiplexers in accordance with various embodiments described herein. The device assembly 1200 includes a number of components disposed on a circuit board 1202. The device assembly 1200 may include components disposed on a first face 1240 of the circuit board 1202 and an opposing second face 1242 of the circuit board 1202; generally, components may be disposed on one or both faces 1240 and 1242.

In some embodiments, the circuit board 1202 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1202. Signal transfer between components or layer may happen with both low resistance DC connections or by either in-plane or out-of-plane capacitive connections. In other embodiments, the circuit board 1202 may be a package substrate or flexible board.

The IC device assembly 1200 illustrated in FIG. 7 may include a package-on-interposer structure 1236 coupled to the first face 1240 of the circuit board 1202 by coupling components 1216. The coupling components 1216 may electrically and mechanically couple the package-on-interposer structure 1236 to the circuit board 1202, and may include solder balls (as shown in FIG. 7), male and female portions of a socket, an adhesive, an underfill material, and/or any other suitable electrical and/or mechanical coupling structure. The coupling components 1216 may include other forms of electrical connections that may have no mechanical contact, such as parallel-plate capacitors or inductors, which can allow high-frequency connection between components without mechanical or DC connection.

The package-on-interposer structure 1236 may include a package 1220 coupled to an interposer 1204 by coupling components 1218. The coupling components 1218 may take any suitable form for the application, such as the forms discussed above with reference to the coupling components 1216. Although a single package 1220 is shown in FIG. 7, multiple packages may be coupled to the interposer 1204; indeed, additional interposers may be coupled to the interposer 1204. The interposer 1204 may provide an intervening substrate used to bridge the circuit board 1202 and the package 1220. In some implementations, the package 1220 may be a quantum circuit device package as described herein, e.g. a package including one or more dies with any of the one or more superconducting qubits and one or more on-chip demultiplexers in accordance with various embodiments described herein, e.g., any of the quantum circuit assemblies 200, 322, or 400, any further embodiments of these assemblies as described herein (e.g. quantum circuit assemblies as shown in FIGS. 2-4 but with different numbers of nearest neighbor qubits, etc.), or any combinations of these assemblies. In other implementations, the package 1220 may be a conventional IC package with non-quantum circuit assemblies. Generally, the interposer 1204 may spread a connection to a wider pitch or reroute a connection to a different connection. For example, the interposer 1204 may couple the package 1220 (e.g., a die) to a ball grid array (BGA) of the coupling components 1216 for coupling to the circuit board 1202. In the embodiment illustrated in FIG. 7, the package 1220 and the circuit board 1202 are attached to opposing sides of the interposer 1204; in other embodiments, the package 1220 and the circuit board 1202 may be attached to a same side of the interposer 1204. In some embodiments, three or more components may be interconnected by way of the interposer 1204.

The interposer 1204 may be formed of a crystalline material, such as silicon, germanium, or other semiconductors, an epoxy resin, a fiberglass-reinforced epoxy resin, a ceramic material, or a polymer material such as polyimide. In some embodiments, the interposer 1204 may be formed of alternate rigid or flexible materials that may include the same materials described above for use in a semiconductor substrate, such as silicon, germanium, and other group III-V and group IV materials. The interposer 1204 may include metal interconnects 1210 and vias 1208, including but not limited to TSVs 1206. The interposer 1204 may further include embedded devices 1214, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as RF devices, power amplifiers, power management devices, antennas, arrays, sensors, and microelectromechanical systems (MEMS) devices may also be formed on the interposer 1204. The package-on-interposer structure 1236 may take the form of any of the package-on-interposer structures known in the art.

The device assembly 1200 may include a package 1224 coupled to the first face 1240 of the circuit board 1202 by coupling components 1222. The coupling components 1222 may take the form of any of the embodiments discussed above with reference to the coupling components 1216, and the package 1224 may take the form of any of the embodiments discussed above with reference to the package 1220. Thus, the package 1224 may be a package including one or more quantum circuit assemblies with one or more superconducting qubits and one or more on-chip demultiplexers in accordance with any of the embodiments described herein or may be a conventional IC package, for example. In some embodiments, the package 1224 may take the form of any of the embodiments of the quantum circuit assemblies with qubits arranged in accordance with various layout designs described herein, e.g. the package 1224 may be a package including one or more dies with any of the one or more superconducting qubits and one or more on-chip demultiplexers in accordance with various embodiments described herein, e.g., any of the quantum circuit assemblies 200, 322, or 400, any further embodiments of these assemblies as described herein (e.g. quantum circuit assemblies as shown in FIGS. 2-4 but with different numbers of nearest neighbor qubits, etc.), or any combinations of these assemblies.

The device assembly 1200 illustrated in FIG. 7 includes a package-on-package structure 1234 coupled to the second face 1242 of the circuit board 1202 by coupling components 1228. The package-on-package structure 1234 may include a package 1226 and a package 1232 coupled together by coupling components 1230 such that the package 1226 is disposed between the circuit board 1202 and the package 1232. The coupling components 1228 and 1230 may take the form of any of the embodiments of the coupling components 1216 discussed above, and the packages 1226 and 1232 may take the form of any of the embodiments of the package 1220 discussed above. Each of the packages 1226 and 1232 may be a qubit device package with one or more on-chip demultiplexers as described herein or may be a conventional IC package, for example. In some embodiments, one or both of the packages 1226 and 1232 may be a package including one or more dies with any of the one or more superconducting qubits and one or more on-chip demultiplexers in accordance with various embodiments described herein, e.g., any of the quantum circuit assemblies 200, 322, or 400, any further embodiments of these assemblies as described herein (e.g. quantum circuit assemblies as shown in FIGS. 2-4 but with different numbers of nearest neighbor qubits, etc.), or any combinations of these assemblies. In some embodiments, some instances of the qubit packages 1220, 1224, 1226, or 1232 may include one or more qubit devices as described herein, but not the demultiplexers as described herein, while other instances of the qubit packages 1220, 1224, 1226, or 1232 may include one or more demultiplexers as described herein but not the qubit devices.

Figure 8:
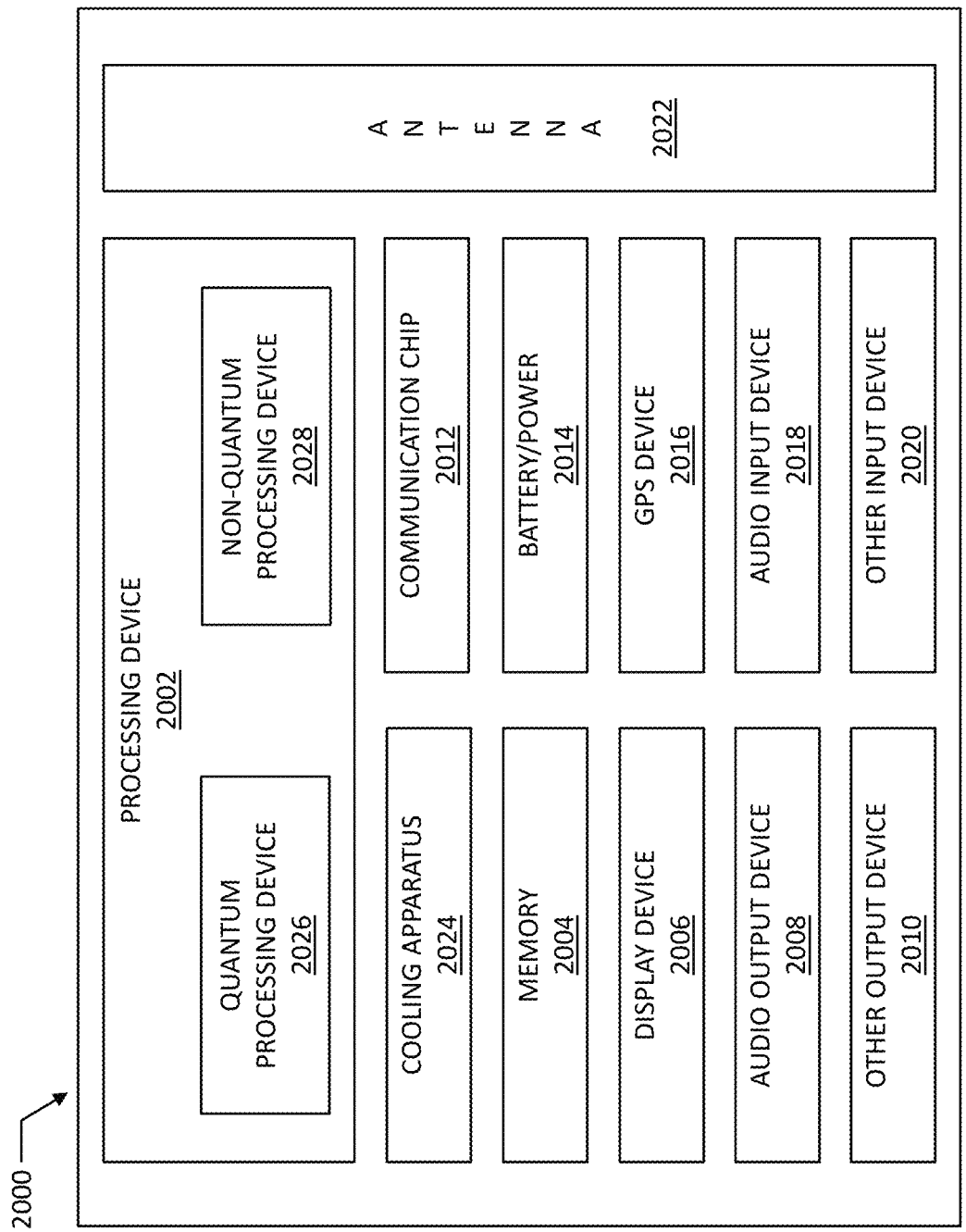
FIG. 8 is a block diagram of an exemplary quantum computing device that may include one or more of quantum circuit assemblies with superconducting qubits and on-chip demultiplexers, according to some embodiments of the present disclosure.

FIG. 8 is a block diagram of an exemplary quantum computing device 2000 that may include one or more of quantum circuit assemblies with one or more superconducting qubits and one or more on-chip demultiplexers according to any of the embodiments described herein. A number of components are illustrated in FIG. 8 as included in the quantum computing device 2000, but any one or more of these components may be omitted or duplicated, as suitable for the application. In some embodiments, some or all of the components included in the quantum computing device 2000 may be attached to one or more PCBs (e.g., a motherboard), and may be included in, or include, any of the quantum circuits with any of the quantum circuit assemblies described herein. In some embodiments, various ones of these components may be fabricated onto a single system-on-a-chip (SoC) die. Additionally, in various embodiments, the quantum computing device 2000 may not include one or more of the components illustrated in FIG. 8, but the quantum computing device 2000 may include interface circuitry for coupling to the one or more components. For example, the quantum computing device 2000 may not include a display device 2006, but may include display device interface circuitry (e.g., a connector and driver circuitry) to which a display device 2006 may be coupled. In another set of examples, the quantum computing device 2000 may not include an audio input device 2018 or an audio output device 2008, but may include audio input or output device interface circuitry (e.g., connectors and supporting circuitry) to which an audio input device 2018 or audio output device 2008 may be coupled. In further examples, the quantum computing device 2000 may include a microwave input device or a microwave output device (not specifically shown in FIG. 8), or may include microwave input or output device interface circuitry (e.g., connectors and supporting circuitry) to which a microwave input device or microwave output device may be coupled.

The quantum computing device 2000 may include a processing device 2002 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 2002 may include a quantum processing device 2026 (e.g., one or more quantum processing devices), and a non-quantum processing device 2028 (e.g., one or more non-quantum processing devices). The quantum processing device 2026 may include one or more of the quantum circuit assemblies with one or more superconducting qubits and one or more on-chip demultiplexers according to any of the embodiments described herein, e.g., the quantum circuit assemblies 200, 322, or 400, or any further embodiments of these assemblies as described herein (e.g. quantum circuit assemblies as shown in FIGS. 2-4 but with different numbers of nearest neighbor qubits, etc.), or any combinations of these assemblies, and may perform data processing by performing operations on the qubits that may be generated in these quantum circuit assemblies, and monitoring the result of those operations. For example, as discussed above, different qubits may be allowed to interact, the quantum states of different qubits may be set or transformed, and the quantum states of different qubits may be read. The quantum processing device 2026 may be a universal quantum processor, or specialized quantum processor configured to run one or more particular quantum algorithms. In some embodiments, the quantum processing device 2026 may execute algorithms that are particularly suitable for quantum computers, such as cryptographic algorithms that utilize prime factorization, encryption/decryption, algorithms to optimize chemical reactions, algorithms to model protein folding, etc. The quantum processing device 2026 may also include support circuitry to support the processing capability of the quantum processing device 2026, such as 10 channels, multiplexers, signal mixers, quantum amplifiers, and analog-to-digital converters.

As noted above, the processing device 2002 may include a non-quantum processing device 2028. In some embodiments, the non-quantum processing device 2028 may provide peripheral logic to support the operation of the quantum processing device 2026. For example, the non-quantum processing device 2028 may control the performance of a read operation, control the performance of a write operation, control the clearing of quantum bits, etc. The non-quantum processing device 2028 may also perform conventional computing functions to supplement the computing functions provided by the quantum processing device 2026. For example, the non-quantum processing device 2028 may interface with one or more of the other components of the quantum computing device 2000 (e.g., the communication chip 2012 discussed below, the display device 2006 discussed below, etc.) in a conventional manner, and may serve as an interface between the quantum processing device 2026 and conventional components. The non-quantum processing device 2028 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices.

The quantum computing device 2000 may include a memory 2004, which may itself include one or more memory devices such as volatile memory (e.g., dynamic random access memory (DRAM)), nonvolatile memory (e.g., read-only memory (ROM)), flash memory, solid-state memory, and/or a hard drive. In some embodiments, the states of qubits in the quantum processing device 2026 may be read and stored in the memory 2004. In some embodiments, the memory 2004 may include memory that shares a die with the non-quantum processing device 2028. This memory may be used as cache memory and may include embedded dynamic random access memory (eDRAM) or spin transfer torque magnetic random access memory (STT-M RAM).

The quantum computing device 2000 may include a cooling apparatus 2024. The cooling apparatus 2024 may maintain the quantum processing device 2026, in particular the quantum circuits 100 as described herein, at a predetermined low temperature during operation to avoid qubit decoherence and to reduce the effects of scattering in the quantum processing device 2026. This predetermined low temperature may vary depending on the setting; in some embodiments, the temperature may be 5 degrees Kelvin or less. In some embodiments, the non-quantum processing device 2028 (and various other components of the quantum computing device 2000) may not be cooled by the cooling apparatus 2030, and may instead operate at room temperature. The cooling apparatus 2024 may be, for example, a dilution refrigerator, a helium-3 refrigerator, or a liquid helium refrigerator.

In some embodiments, the quantum computing device 2000 may include a communication chip 2012 (e.g., one or more communication chips). For example, the communication chip 2012 may be configured for managing wireless communications for the transfer of data to and from the quantum computing device 2000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 2012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 2012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2012 may operate in accordance with other wireless protocols in other embodiments. The quantum computing device 2000 may include an antenna 2022 to facilitate wireless communications and/or to receive other wireless communications (such as AM or FM radio transmissions).

In some embodiments, the communication chip 2012 may manage wired communications, such as electrical, optical, or any other suitable communication protocols (e.g., the Ethernet). As noted above, the communication chip 2012 may include multiple communication chips. For instance, a first communication chip 2012 may be dedicated to shorter-range wireless communications such as Wi-Fi or Bluetooth, and a second communication chip 2012 may be dedicated to longer-range wireless communications such as global positioning system (GPS), EDGE, GPRS, CDMA, WiMAX, LTE, EV-DO, or others. In some embodiments, a first communication chip 2012 may be dedicated to wireless communications, and a second communication chip 2012 may be dedicated to wired communications.

The quantum computing device 2000 may include battery/power circuitry 2014. The battery/power circuitry 2014 may include one or more energy storage devices (e.g., batteries or capacitors) and/or circuitry for coupling components of the quantum computing device 2000 to an energy source separate from the quantum computing device 2000 (e.g., AC line power).

The quantum computing device 2000 may include a display device 2006 (or corresponding interface circuitry, as discussed above). The display device 2006 may include any visual indicators, such as a heads-up display, a computer monitor, a projector, a touchscreen display, a liquid crystal display (LCD), a light-emitting diode display, or a flat panel display, for example.

The quantum computing device 2000 may include an audio output device 2008 (or corresponding interface circuitry, as discussed above). The audio output device 2008 may include any device that generates an audible indicator, such as speakers, headsets, or earbuds, for example.

The quantum computing device 2000 may include an audio input device 2018 (or corresponding interface circuitry, as discussed above). The audio input device 2018 may include any device that generates a signal representative of a sound, such as microphones, microphone arrays, or digital instruments (e.g., instruments having a musical instrument digital interface (MIDI) output).

The quantum computing device 2000 may include a GPS device 2016 (or corresponding interface circuitry, as discussed above). The GPS device 2016 may be in communication with a satellite-based system and may receive a location of the quantum computing device 2000, as known in the art.

The quantum computing device 2000 may include an other output device 2010 (or corresponding interface circuitry, as discussed above). Examples of the other output device 2010 may include an audio codec, a video codec, a printer, a wired or wireless transmitter for providing information to other devices, or an additional storage device.

The quantum computing device 2000 may include an other input device 2020 (or corresponding interface circuitry, as discussed above). Examples of the other input device 2020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The quantum computing device 2000, or a subset of its components, may have any appropriate form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device.

SELECT EXAMPLES

The following paragraphs provide examples of various ones of the embodiments disclosed herein.

Example 1 provides a quantum circuit assembly that includes a substrate; one or more qubit devices provided over, on, or at least partially in the substrate; and a demultiplexer. The demultiplexer may be configured to receive a combined signal including at least a first signal in a first frequency range and a second signal in a second frequency range, and, based on the combined signal, generate a first demultiplexed signal as a signal indicative of (e.g. including) the first signal separated from the combined signal, and generate a second demultiplexed signal as a signal indicative of (e.g. including) the second signal separated from the combined signal. The demultiplexer may further be configured to provide the first and second demultiplexed signals to one or more of the one or more qubit devices.

Example 2 provides the quantum circuit assembly according to Example 1, where the first signal is a flux bias signal for a first qubit device of the one or more qubit devices, the second signal is a microwave drive signal for the first qubit device, and providing the first and second demultiplexed signals to the one or more qubit devices includes providing the first and second demultiplexed signal to the first qubit device.

Example 3 provides the quantum circuit assembly according to Example 1, where the one or more qubit devices include at least a first qubit device and a second qubit device, the first signal is a microwave drive signal for the first qubit device, the second signal is a microwave drive signal for the second qubit device, and providing the first and second demultiplexed signals to the one or more qubit devices includes providing the first demultiplexed signal to the first qubit device and providing the second demultiplexed signal to the second qubit device.

Example 4 provides the quantum circuit assembly according to Example 3, where the combined signal further includes a third signal in a third frequency range, where the third signal is a flux bias signal for the first qubit device, the demultiplexer is further configured to generate a third demultiplexed signal as a signal indicative of (e.g. including) the third signal separated from the combined signal, and providing the first and second demultiplexed signals to the one or more qubit devices further includes providing the third demultiplexed signal to the first qubit device.

Example 5 provides the quantum circuit assembly according to Example 3, where the one or more qubit devices further include a third qubit device, the combined signal further includes a third signal in a third frequency range, where the third signal is a flux bias signal for the third qubit device, the demultiplexer is further configured to generate a third demultiplexed signal as a signal indicative of (e.g. including) the third signal separated from the combined signal, and providing the first and second demultiplexed signals to the one or more qubit devices further includes providing the third demultiplexed signal to the third qubit device.

Example 6 provides the quantum circuit assembly according to any one of the preceding Examples, where the demultiplexer includes one or more first filters configured to generate the first demultiplexed signal as the combined signal in which signal components having a frequency above a first threshold are attenuated (e.g. at least reduced, but possibly eliminated). Thus, the demultiplexer may include one or more first filters acting as an LPF that passes signal components, of the combined signal, having a frequency below the first frequency threshold and attenuates signal components having a frequency above the first threshold.

Example 7 provides the quantum circuit assembly according to Example 6, where the demultiplexer further includes one or more second filters configured to generate the second demultiplexed signal as the combined signal in which signal components having a frequency below the first threshold are attenuated (e.g. at least reduced, but possibly eliminated). Thus, the demultiplexer may include one or more second filters acting as a high-pass filter that passes signal components, of the combined signal, having a frequency above the first frequency threshold and attenuates signal components having a frequency below the first threshold.

Example 8 provides the quantum circuit assembly according to Example 6, where the demultiplexer further includes one or more second filters configured to generate the second demultiplexed signal as the combined signal in which signal components having a frequency below a second threshold are attenuated (e.g. at least reduced, but possibly eliminated). Thus, the demultiplexer may include one or more second filters acting as a high-pass filter that passes signal components, of the combined signal, having a frequency above the second frequency threshold and attenuates signal components having a frequency below the second threshold.

Example 9 provides the quantum circuit assembly according to Example 8, where the second threshold is greater than the first threshold.

Example 10 provides the quantum circuit assembly according to any one of the preceding Examples, where frequency components of the first signal are below about 1 gigahertz and frequency components of the second signal are above about 2 gigahertz. Thus, the first threshold according to any one of the preceding Examples could be set at about 1 GHz, while the second threshold according to any one of the preceding Examples could be set at about 2 GHz.

Example 11 provides the quantum circuit assembly according to any one of the preceding Examples, where the frequency components of the second signal are between about 3 and 20 gigahertz, including all values and ranges therein, e.g. between about 4 and 7 gigahertz.

Example 12 provides the quantum circuit assembly according to any one of the preceding Examples, where the demultiplexer includes one or more first filters configured to generate the first demultiplexed signal as the combined signal in which signal components outside the first frequency range are attenuated (e.g. at least reduced, but possibly eliminated).

Example 13 provides the quantum circuit assembly according to any one of the preceding Examples, where the demultiplexer includes one or more first filters configured to pass/generate the second demultiplexed signal as the combined signal in which signal components outside the second frequency range are attenuated (e.g. at least reduced, but possibly eliminated).

Example 14 provides the quantum circuit assembly according to any one of Examples 1-13, where the demultiplexer is an LC-based demultiplexer.

Example 15 provides the quantum circuit assembly according to any one of Examples 1-13, where the demultiplexer is a transmission line based demultiplexer.

Example 16 provides the quantum circuit assembly according to any one of Examples 1-13, where the demultiplexer is an active demultiplexer including one or more Josephson Junctions.

Example 17 provides the quantum circuit assembly according to any one of Examples 1-13, where the demultiplexer is an acoustic wave filter based demultiplexer (e.g. surface acoustic wave or bulk acoustic wave).

Example 18 provides the quantum circuit assembly according to any one of Examples 1-17, where the demultiplexer is provided over, on, or at least partially in the substrate (i.e. the demultiplexer is implemented on the same substrate/die as the one or more qubit devices).

Example 19 provides the quantum circuit assembly according to Example 18, where the substrate includes a first face and a second face, the second face opposing the first face, and where the qubit device is provided over the first face while the demultiplexer is provided over the second face. Thus, in some embodiments, qubit devices and demultiplexers can be provided on different faces of a substrate, which may be advantageous in terms of leaving more space on the first face for implementing more qubit devices. In such embodiments, the demultiplexer can be connected to the respective qubit devices using TSVs. In other embodiments, qubit devices and at least some of the demultiplexers may be provided on the same face of the substrate, which may be advantageous in terms of simplified manufacturing.

Example 20 provides the quantum circuit assembly according to any one of Examples 1-17, where the substrate is a first substrate, the quantum circuit assembly further including a second substrate and a package substrate, the package substrate coupled to each of the first and the second substrates (i.e. components implemented on the first substrate are coupled to components implemented on the second substrate via the package substrate), and the demultiplexer is provided over, on, or at least partially in the second substrate (i.e. the demultiplexer is implemented on a die different from that on which the one or more qubit devices are implemented, but in a single chip with the qubit die, by virtue of being coupled to the same package substrate as the qubit die).

Example 21 provides the quantum circuit assembly according to any one of the preceding Examples, where the one or more qubit devices and the demultiplexer are included in a single package.

Example 22 provides the quantum circuit assembly according to any one of Examples 1-21, where the one or more qubit devices include a plurality of qubit devices, the quantum circuit assembly includes a plurality of demultiplexers, and each one of the plurality of qubit devices has a different one of the plurality of demultiplexers associated with it (where the "association" is in a given demultiplexer providing first and second signals to, for example, respectively, flux bias line and microwave drive line of a given qubit device in a manner where there is one-to-one correspondence between qubit devices and demultiplexers, i.e. each qubit device is associated with a different one of the demultiplexers, and vice versa).

Example 23 provides the quantum circuit assembly according to any one of Examples 1-21, where the one or more qubit devices include a plurality of qubit devices, the quantum circuit assembly includes a plurality of demultiplexers, and at least one of the demultiplexers is associated with two or more of the plurality of qubit devices (where the "association" is in a given demultiplexer providing first and second signals to two different qubits, for example, respectively, microwave drive line signals to each of two or more qubit devices, in a manner where there is one-to-many correspondence between demultiplexers and qubit devices, i.e. two or more qubit devices may be associated with a single one of the demultiplexers).

Example 24 provides the quantum circuit assembly according to any one of the preceding Examples, further including a control system including a power combiner configured to generate the combined signal by combining the first signal and the second signal. In general, the power combiner is configured to generate a respective combined signal for each of the demultiplexers, when multiple demultiplexers are implemented, by combining individual respective signals that each demultiplexer is supposed to provide to respective qubits.

Example 25 provides a quantum IC package that includes a qubit die including a plurality of qubit devices; a further IC element coupled to the qubit die; and one or more demultiplexers configured to receive combined signals, where an individual combined signal includes a plurality of signals in different frequency ranges, separate the individual combined signals into a first demultiplexed signal and a second demultiplexed signal, where the first demultiplexed signal as a signal indicative of (e.g. including) a first signal in a first frequency range included in the individual combined signal, and the second demultiplexed signal as a signal indicative of (e.g. including) a second signal in a second frequency range included in the individual combined signal, and provide the first and second demultiplexed signals to one or more of the plurality of qubit devices.

Example 26 provides the quantum IC package according to Example 25, where the further IC element is one of an interposer, a circuit board, a flexible board, or a package substrate.

Example 27 provides the quantum IC package according to Examples 25 or 26, where the one or more demultiplexers are included on the qubit die.

Example 28 provides the quantum IC package according to Examples 25 or 26, where the one or more demultiplexers are included on a further die, the further die coupled to at least one of the further IC element and the qubit die.

Various further Examples provide the quantum IC package according to any one of Examples 25-28, where the qubit die and the demultiplexers form a quantum circuit assembly according to any one of Examples 1-24.

Example 29 provides a quantum computing device, including a quantum processing device that includes a quantum circuit component having a plurality of qubits and at least one demultiplexer; and a memory device configured to store data generated by the plurality of qubits during operation of the quantum processing device. The at least one demultiplexer has at least one input port for receiving a combined signal, and further has having two or more frequency-selective output ports (i.e. the at least one demultiplexer is configured to separate the incoming combined signal into two or more signals of different frequency ranges, e.g. a first signal may have a portion of the combined signal having frequency components below a certain threshold while a second signal may have a portion of the combined signal having frequency components above that threshold, and possibly below another threshold, or above a certain other threshold, which two signals are then output via said output ports of the demultiplexer), and is configured to provide, based on the combined signal, a first demultiplexed signal to one or more of the plurality of qubits via a first output port of the two or more frequency-selective output ports, and a second demultiplexed signal to one or more of the plurality of qubits via a second output port of the two or more frequency-selective output ports.

Example 30 provides the quantum computing device according to Example 29, further including a control logic coupled to the quantum circuit component and configured to control operation of the quantum circuit component.

Example 31 provides the quantum computing device according to Example 30, where the control logic is configured to provide to the at least one demultiplexer the combined signal, and the at least one demultiplexer is configured to generate the first demultiplexed signal as a signal indicative of (e.g. including) a first signal in a first frequency range included in the combined signal, and the second demultiplexed signal as a signal indicative of (e.g. including) a second signal in a second frequency range included in the combined signal.

Example 32 provides the quantum computing device according to Example 31, where the control logic includes a power combiner configured to combine the first signal and the second signal to generate the combined signal.

Example 33 provides the quantum computing device according to any one of Examples 29-32, further including a cooling apparatus configured to maintain a temperature of the quantum processing device below 5 degrees Kelvin.

Example 34 provides the quantum computing device according to Example 33, where the cooling apparatus includes a dilution refrigerator.

Example 35 provides the quantum computing device according to any one of Examples 29-34, where the memory device is configured to store instructions for a quantum computing algorithm to be executed by the quantum processing device.

Example 36 provides the quantum computing device according to any one of Examples 29-35, further including a non-quantum processing device coupled to the quantum processing device.

In various further Examples, the quantum circuit component of the quantum processing device according to any one of Examples 29-36 may be implemented as the quantum circuit assembly according to any one of Examples 1-24 and/or may include the quantum IC package according to any one of Examples 25-28.

The invention claimed is:

1. A quantum circuit assembly, comprising:
   a substrate having a first face and a second face, the second face opposite the first face;
   one or more qubit devices over, on, or at least partially in the first face of the substrate; and
   a demultiplexer over the second face of the substrate, wherein the demultiplexer is an active demultiplexer comprising one or more Josephson Junctions and wherein the demultiplexer is to:
      receive a combined signal comprising at least a first signal in a first frequency range and a second signal in a second frequency range,
      based on the combined signal, generate a first demultiplexed signal as a signal indicative of the first signal, and generate a second demultiplexed signal as a signal indicative of the second signal, and
      provide the first and second demultiplexed signals to one or more of the one or more qubit devices,
   wherein:
      the first signal is a flux bias signal to tune a qubit frequency of a first qubit device of the one or more qubit devices,
      the second signal is a microwave drive signal to control a state of the first qubit device, and
      providing the first and second demultiplexed signals to the one or more qubit devices includes providing the first and second demultiplexed signal to the first qubit device.

2. The quantum circuit assembly according to claim 1, wherein the demultiplexer includes one or more first filters configured to generate the first demultiplexed signal as the combined signal in which signal components having a frequency above a first threshold are attenuated.

3. The quantum circuit assembly according to claim 2, wherein the demultiplexer further includes one or more second filters configured to generate the second demultiplexed signal as the combined signal in which signal components having a frequency below a second threshold are attenuated, wherein the second threshold is greater than the first threshold.

4. The quantum circuit assembly according to claim 1, wherein frequency components of the first signal are below 1 gigahertz and frequency components of the second signal are above 2 gigahertz.

5. The quantum circuit assembly according to claim 1, wherein the demultiplexer includes one or more first filters configured to generate the first demultiplexed signal as the combined signal in which signal components outside the first frequency range are attenuated.

6. The quantum circuit assembly according to claim 1, wherein the demultiplexer includes one or more first filters configured to pass the second demultiplexed signal as the combined signal in which signal components outside the second frequency range are attenuated.

7. The quantum circuit assembly according to claim 1, wherein:
   the substrate is a first substrate,
   the quantum circuit assembly further comprising a second substrate and a package substrate, the package substrate coupled to each of the first and the second substrates, and
   the demultiplexer is over, on, or at least partially in the second substrate.

8. The quantum circuit assembly according to claim 1, wherein the one or more qubit devices and the demultiplexer are included in a single package.

9. The quantum circuit assembly according to claim 1, wherein:
   the one or more qubit devices include a plurality of qubit devices,
   the quantum circuit assembly includes a plurality of demultiplexers, and
   each one of the plurality of qubit devices has a different one of the plurality of demultiplexers associated with it.

10. The quantum circuit assembly according to claim 1, wherein:
    the one or more qubit devices include a plurality of qubit devices,
    the quantum circuit assembly includes a plurality of demultiplexers, and
    at least one of the demultiplexers is associated with two or more of the plurality of qubit devices.

11. A quantum integrated circuit (IC) package, comprising:
    a qubit die having a first face and a second face, the second face opposite the first face, the qubit die comprising a plurality of qubit devices over the first face;
    a further IC element, coupled to the qubit die; and
    one or more demultiplexers over the second face, the one or more demultiplexers configured to:
       receive combined signals, where an individual combined signal includes a plurality of signals in different frequency ranges,
       separate the individual combined signals into a first demultiplexed signal and a second demultiplexed signal, where the first demultiplexed signal as a signal indicative of a first signal in a first frequency range included in the individual combined signal, and the second demultiplexed signal as a signal indicative of a second signal in a second frequency range included in the individual combined signal, and provide the first and second demultiplexed signals to one or more of the plurality of qubit devices, wherein:
at least one of the one or more demultiplexers is an active demultiplexer comprising one or more Josephson Junctions, the first demultiplexed signal is a flux bias signal to tune a qubit frequency of a first qubit device of the one or more of the plurality of qubit devices, the second demultiplexed signal is a microwave drive signal to control a state of the first qubit device, and providing the first and second demultiplexed signals to the one or more of the plurality of qubit devices includes providing the first and second demultiplexed signal to the first qubit device.

12. The quantum IC package according to claim 11, wherein the further IC element is one of an interposer, a circuit board, a flexible board, or a package substrate.

13. A quantum computing device, comprising:
a quantum processing device that includes a quantum circuit component that includes a substrate having a first face and a second face, the second face opposite the first face, where the quantum circuit component further includes a plurality of qubits over the first face of the substrate and at least one demultiplexer over the second face of the substrate; and a memory device configured to store data generated by the plurality of qubits during operation of the quantum processing device, where the at least one demultiplexer
is an active demultiplexer comprising one or more Josephson Junctions, has at least one input port for receiving a combined signal, and further has having two or more frequency-selective output ports, and is configured to provide, based on the combined signal, a first demultiplexed signal to one or more of the plurality of qubits via a first output port of the two or more frequency-selective output ports, and a second demultiplexed signal to one or more of the plurality of qubits via a second output port of the two or more frequency-selective output ports, and wherein:
the first demultiplexed signal is a flux bias signal to tune a qubit frequency of a first qubit of the one or more of the plurality of qubits, the second demultiplexed signal is a microwave drive signal to control a state of the first qubit, and providing the first and second demultiplexed signals to the one or more of the plurality of qubits includes providing the first and second demultiplexed signal to the first qubit.

14. The quantum computing device according to claim 13, further including a control logic coupled to the quantum circuit component and configured to control operation of the quantum circuit component.

15. The quantum computing device according to claim 14, wherein:
the control logic is configured to provide to the at least one demultiplexer the combined signal, and the at least one demultiplexer is configured to generate the first demultiplexed signal as a signal indicative of a first signal in a first frequency range included in the combined signal, and the second demultiplexed signal as a signal indicative of a second signal in a second frequency range included in the combined signal.

16. The quantum computing device according to claim 14, wherein the control logic includes a power combiner configured to combine the first signal and the second signal to generate the combined signal.

17. The quantum IC package according to claim 11, wherein the one or more demultiplexers include one or more first filters configured to generate the first demultiplexed signal as the individual combined signal in which signal components having a frequency above a first threshold are attenuated.

18. The quantum IC package according to claim 17, wherein the one or more demultiplexers further include one or more second filters configured to generate the second demultiplexed signal as the individual combined signal in which signal components having a frequency below a second threshold are attenuated, wherein the second threshold is greater than the first threshold.

19. The quantum IC package according to claim 11, wherein frequency components of the first demultiplexed signal are below 1 gigahertz and frequency components of the second demultiplexed signal are above 2 gigahertz.

20. The quantum IC package according to claim 11, wherein the one or more demultiplexers include one or more first filters configured to generate the first demultiplexed signal as the individual combined signal in which signal components outside the first frequency range are attenuated.

21. The quantum IC package according to claim 11, wherein the one or more demultiplexers include one or more first filters configured to pass the second demultiplexed signal as the individual combined signal in which signal components outside the second frequency range are attenuated.

22. The quantum computing device according to claim 13, further including a cooling apparatus, to maintain a temperature of the quantum processing device below 5 degrees Kelvin.

23. The quantum computing device according to claim 22, wherein the cooling apparatus is a dilution refrigerator.

* * * * *